(12) United States Patent
Moribe et al.

(10) Patent No.: US 11,936,835 B2
(45) Date of Patent: Mar. 19, 2024

(54) IMAGE PROCESSING APPARATUS, IMAGE PROCESSING METHOD, AND STORAGE MEDIUM WHICH REDUCE A COLOR DIFFERENCE AND A FREQUENCY DIFFERENCE BETWEEN TWO IMAGES

(71) Applicant: CANON KABUSHIKI KAISHA, Tokyo (JP)

(72) Inventors: Shoei Moribe, Kawasaki (JP); Akitoshi Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/990,439

(22) Filed: Aug. 11, 2020

(65) Prior Publication Data

US 2021/0060969 A1 Mar. 4, 2021

(30) Foreign Application Priority Data

Aug. 30, 2019 (JP) .................... 2019-158451

(51) Int. Cl.
*H04N 1/60* (2006.01)
*B41J 2/21* (2006.01)
*H04N 1/40* (2006.01)

(52) U.S. Cl.
CPC .......... *H04N 1/6041* (2013.01); *B41J 2/2132* (2013.01); *H04N 1/40087* (2013.01); *H04N 1/6008* (2013.01)

(58) Field of Classification Search
CPC .................................................... B41J 2/2132
See application file for complete search history.

(56) References Cited

U.S. PATENT DOCUMENTS

| 6,313,925 B1 * | 11/2001 | Decker | H04N 1/6025 358/529 |
| 9,132,630 B2 * | 9/2015 | Ochiai | B41J 2/2125 |
| 10,726,316 B2 * | 7/2020 | Kato | G06K 15/188 |
| 2007/0273899 A1 * | 11/2007 | Yazawa | B41J 2/2132 358/1.4 |

(Continued)

FOREIGN PATENT DOCUMENTS

| JP | 10-013674 A | 1/1998 |
| JP | 2011-245652 A | 12/2011 |
| JP | 2014-100795 A | 6/2014 |

*Primary Examiner* — Barbara D Reinier
(74) *Attorney, Agent, or Firm* — Canon U.S.A., Inc. I.P. Division

(57) ABSTRACT

An image processing apparatus converts a first combination including color signals respectively corresponding to first ink, second ink, and third ink, which are input to be recorded in a first area on a recording medium into a second combination including color signals respectively corresponding to the first ink, the second ink, and the third ink, and converts a third combination including color signals respective corresponding to the first ink, the second ink, and the third ink which are input to be recorded in a second area on the recording medium into a fourth combination including color signals respectively corresponding to the first ink, the second ink, and the third ink, wherein a difference between a color of a first image and a color of a second image is reduced and a difference between a frequency of the first image and a frequency of the second image is reduced.

18 Claims, 14 Drawing Sheets

(56) References Cited

U.S. PATENT DOCUMENTS

2011/0285779 A1* 11/2011 Yamada ............... H04N 1/6041
  347/15
2014/0139855 A1* 5/2014 Iguchi .................. H04N 1/4051
  358/1.9

* cited by examiner

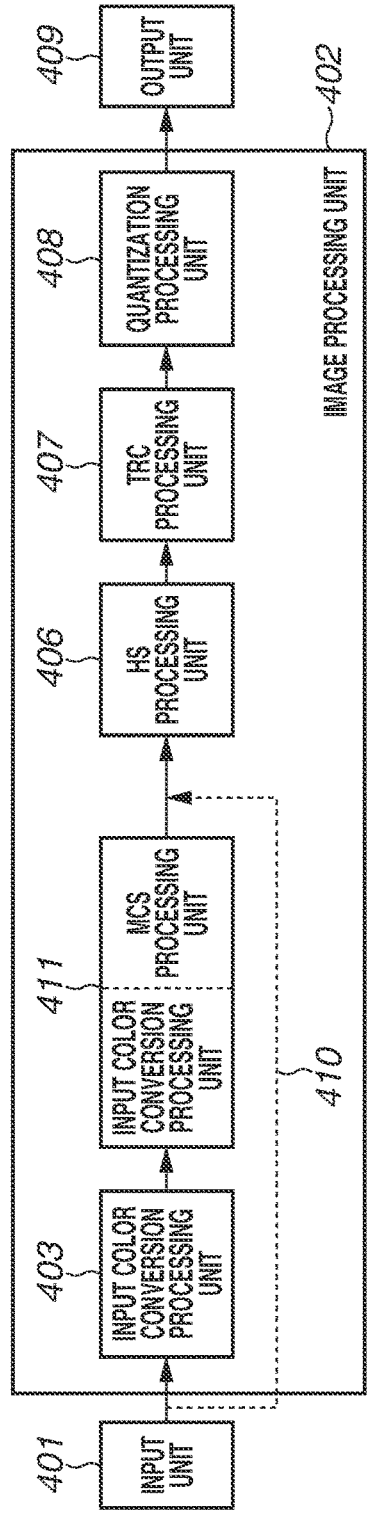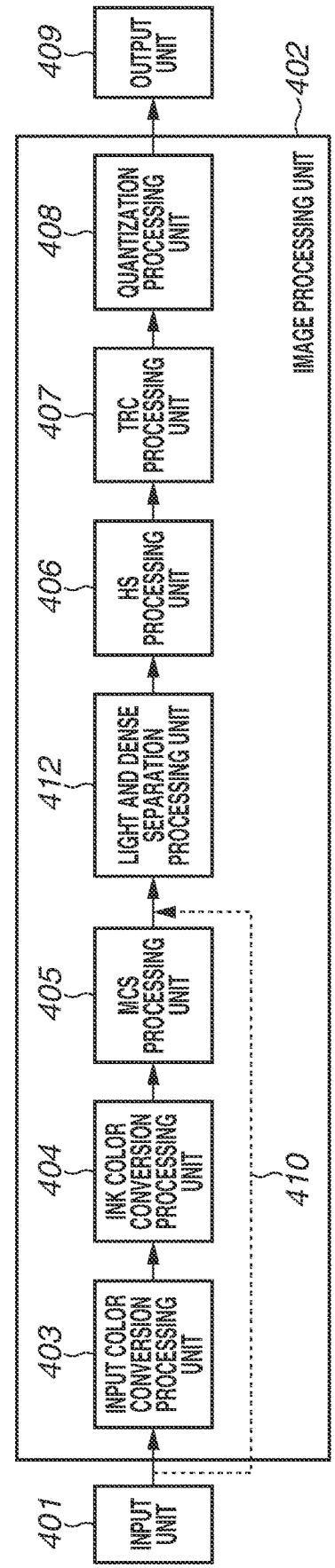

FIG.9A

| K | C | M | Y | ΔK1 | ΔC1 | ΔM1 | ΔY1 |
|---|---|---|---|---|---|---|---|
| 0 | 0 | 0 | 0 | 0 | 0 | 0 | 0 |
| 0 | 0 | 0 | 64 | 0 | 0 | 0 | 0 |
| ⋮ | ⋮ | ⋮ | ⋮ | ⋮ | ⋮ | ⋮ | ⋮ |
| 0 | 0 | 0 | 255 | 0 | 0 | 0 | 0 |
| 0 | 0 | 64 | 0 | 0 | 0 | 0 | 0 |
| ⋮ | ⋮ | ⋮ | ⋮ | ⋮ | ⋮ | ⋮ | ⋮ |
| 0 | 255 | 255 | 0 | 0 | 0 | 0 | 0 |
| ⋮ | ⋮ | ⋮ | ⋮ | ⋮ | ⋮ | ⋮ | ⋮ |
| 64 | 192 | 192 | 192 | 0 | 0 | 0 | 0 |
| ⋮ | ⋮ | ⋮ | ⋮ | ⋮ | ⋮ | ⋮ | ⋮ |

FIG.9B

| K | C | M | Y | ΔK2 | ΔC2 | ΔM2 | ΔY2 |
|---|---|---|---|---|---|---|---|
| 0 | 0 | 0 | 0 | 0 | 0 | 0 | 0 |
| 0 | 0 | 0 | 64 | 0 | 0 | 0 | 0 |
| ⋮ | ⋮ | ⋮ | ⋮ | ⋮ | ⋮ | ⋮ | ⋮ |
| 0 | 0 | 0 | 255 | 0 | 0 | 0 | 0 |
| 0 | 0 | 64 | 0 | 0 | 0 | 0 | 0 |
| ⋮ | ⋮ | ⋮ | ⋮ | ⋮ | ⋮ | ⋮ | ⋮ |
| 0 | 255 | 255 | 0 | 0 | -32 | 0 | 0 |
| ⋮ | ⋮ | ⋮ | ⋮ | ⋮ | ⋮ | ⋮ | ⋮ |
| 64 | 192 | 192 | 192 | 0 | -32 | 0 | -32 |
| ⋮ | ⋮ | ⋮ | ⋮ | ⋮ | ⋮ | ⋮ | ⋮ |

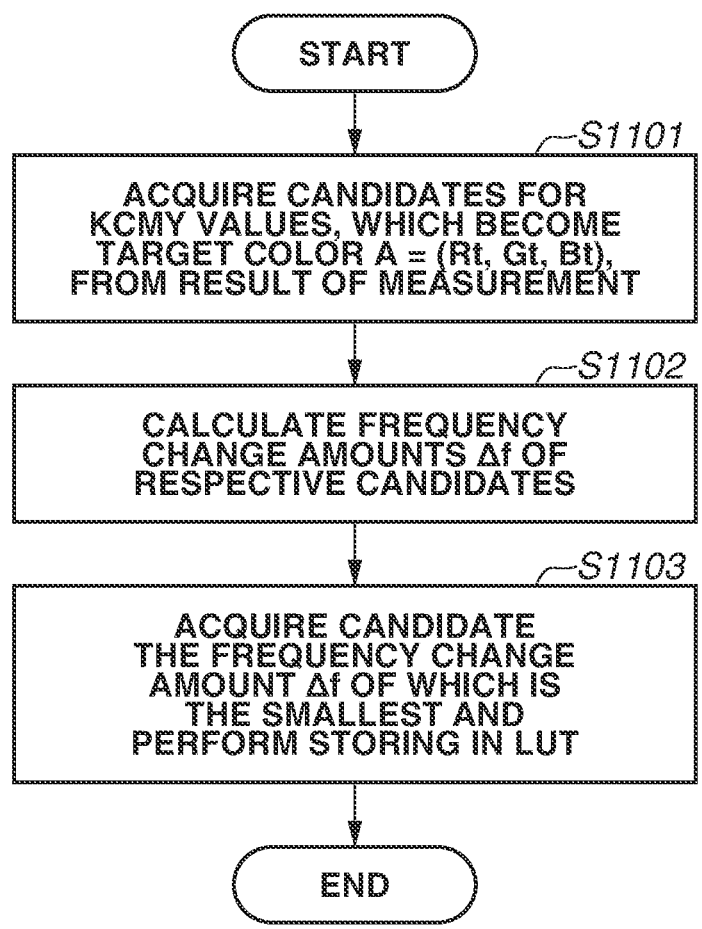

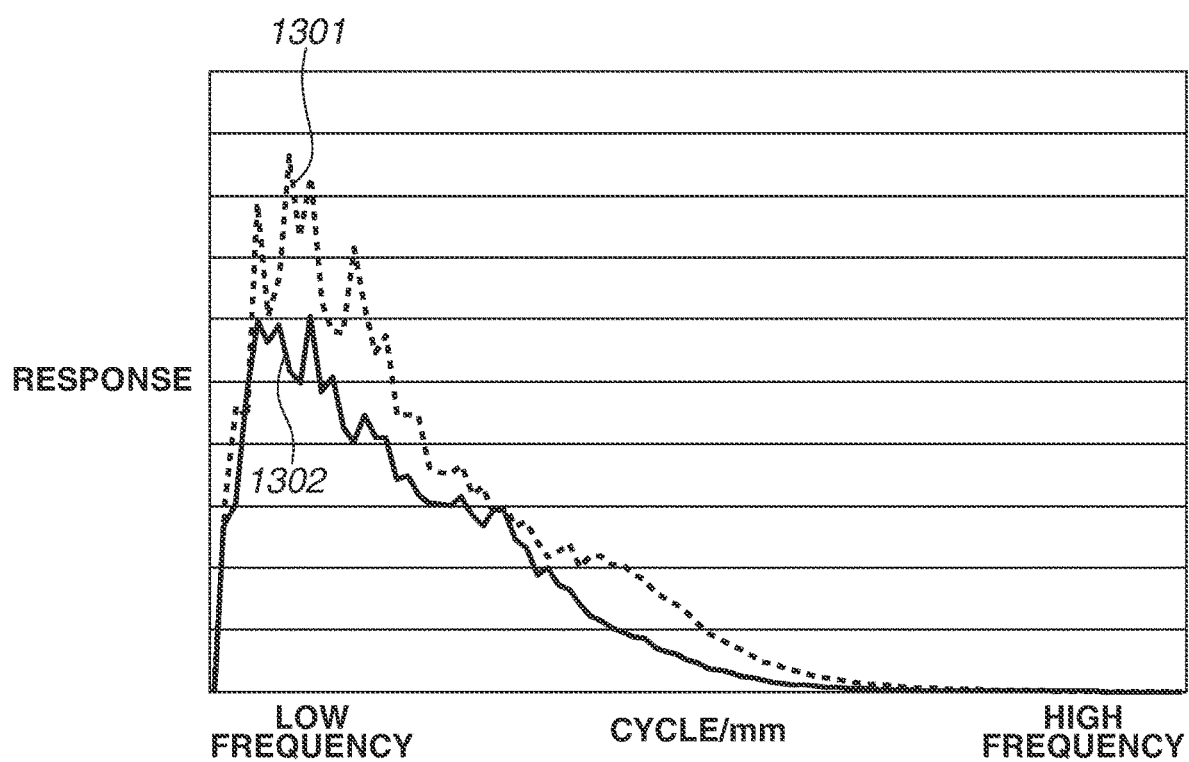

IMAGE PROCESSING APPARATUS, IMAGE PROCESSING METHOD, AND STORAGE MEDIUM WHICH REDUCE A COLOR DIFFERENCE AND A FREQUENCY DIFFERENCE BETWEEN TWO IMAGES

BACKGROUND

Field of the Disclosure

Aspects of the present disclosure generally relate to an image processing apparatus, an image processing method, and a storage medium and, more particularly, to image processing for reducing the unevenness of density (density unevenness) caused by variation in the amount of discharge between a plurality of nozzles each of which discharges ink.

Description of the Related Art

Recording heads for use in recording apparatuses of the inkjet type may have variation between nozzles in the amount of ink per droplet discharged from each nozzle (hereinafter referred to as a "discharge amount"), due to a cause such as manufacturing errors of the nozzles. Such variation in discharge amount may cause density unevenness to occur in an image to be recorded. As conventional processing for reducing such density unevenness, a head shading (HS) technique such as that discussed in Japanese Patent Application Laid-Open No. 10-013674 is known. The head shading technique corrects image data according to information about the discharge amount for each nozzle and thus increases or decreases the number of ink droplets (dots) to be applied to a recording medium, thus adjusting the density of an image to be recorded.

However, in a case where a multi-order color is intended to be expressed by superposing two or more types of ink on each other, even with the use of the above-mentioned head shading technique, what is called a color shift, in which the color of a recorded region is different from a color to be originally recorded, may occur. To address such a color shift, Japanese Patent Application Laid-Open No. 2011-245652 discusses a technique called "multi-color shading (MCS) processing". Whereas the HS technique is processing for correcting density unevenness targeted at respective ink colors, the MCS processing is processing for reducing color unevenness in a multi-order color image.

However, color unevenness between regions may become visible despite color correction for a multi-order color being made by use of the MCS processing discussed in Japanese Patent Application Laid-Open No. 2011-245652. Even when respective values obtained by measuring colors recorded in a plurality of regions on a recording medium are the same value, if spatial frequencies differ between regions, such a difference in spatial frequency may cause the recorded colors to be seen as different colors with the human eye and thus cause a feeling that there is color unevenness.

SUMMARY

Aspects of the present disclosure are generally directed to an image processing apparatus, an image processing method, and a storage medium each of which is capable of reducing a color difference and a frequency difference in a multi-order color image which occur due to variation in discharge characteristic between nozzles in the case of recording an image with use of a plurality of types of ink.

According to an aspect of the present disclosure, an image processing apparatus for a printing apparatus is provided, wherein the printing apparatus records an image in a first area on a recording medium with use of a first nozzle group in a first nozzle array including a plurality of nozzles for discharging first ink arranged in a predetermined direction, a second nozzle group in a second nozzle array including a plurality of nozzles for discharging second ink arranged in the predetermined direction, and a third nozzle group in a third nozzle array including a plurality of nozzles for discharging third ink arranged in the predetermined direction, and wherein the printing apparatus records an image in a second area different in position in the predetermined direction from the first area on the recording medium with use of a fourth nozzle group which does not include nozzles included in the first nozzle group out of the plurality of nozzles of the first nozzle array, a fifth nozzle group which does not include nozzles included in the second nozzle group out of the plurality of nozzles of the second nozzle array, and a sixth nozzle group which does not include nozzles included in the third nozzle group out of the plurality of nozzles of the third nozzle array, and the image processing apparatus includes a conversion unit configured to convert a first combination including a color signal corresponding to the first ink, a color signal corresponding to the second ink, and a color signal corresponding to the third ink which are input to be recorded in the first area into a second combination including a color signal corresponding to the first ink, a color signal corresponding to the second ink, and a color signal corresponding to the third ink, and to convert a third combination including a color signal corresponding to the first ink, a color signal corresponding to the second ink, and a color signal corresponding to the third ink which are input to be recorded in the second area into a fourth combination including a color signal corresponding to the first ink, a color signal corresponding to the second ink, and a color signal corresponding to the third ink, wherein a difference between a color of a first image and a color of a second image is reduced and a difference between a frequency of the first image and a frequency of the second image is reduced, wherein, in a case where the first combination is a predetermined plurality of color signals, the first image is an image which is to be recorded in the first area by the printing apparatus with use of the first nozzle group, the second nozzle group, and the third nozzle group based on the second combination obtained by conversion, and wherein, in a case where the third combination is the predetermined plurality of color signals, the second image is an image which is to be recorded in the second area by the printing apparatus with use of the fourth nozzle group, the fifth nozzle group, and the sixth nozzle group based on the fourth combination obtained by conversion.

Further features of the present disclosure will become apparent from the following description of exemplary embodiments with reference to the attached drawings.

BRIEF DESCRIPTION OF THE DRAWINGS

FIGS. 4A, 4B, 4C, and 4D are block diagrams illustrating image processing configurations.

FIGS. 9A and 9B are diagrams illustrating conversion table parameters for use in MCS processing in the first exemplary embodiment.

FIG. 11 is a flowchart illustrating processing for generating a three-dimensional lookup table.

FIG. 13 is a diagram used to explain a difference in spatial frequency.

DESCRIPTION OF THE EMBODIMENTS

Various exemplary embodiments, features, and aspects of the disclosure will be described in detail below with reference to the drawings.

Figure 1:
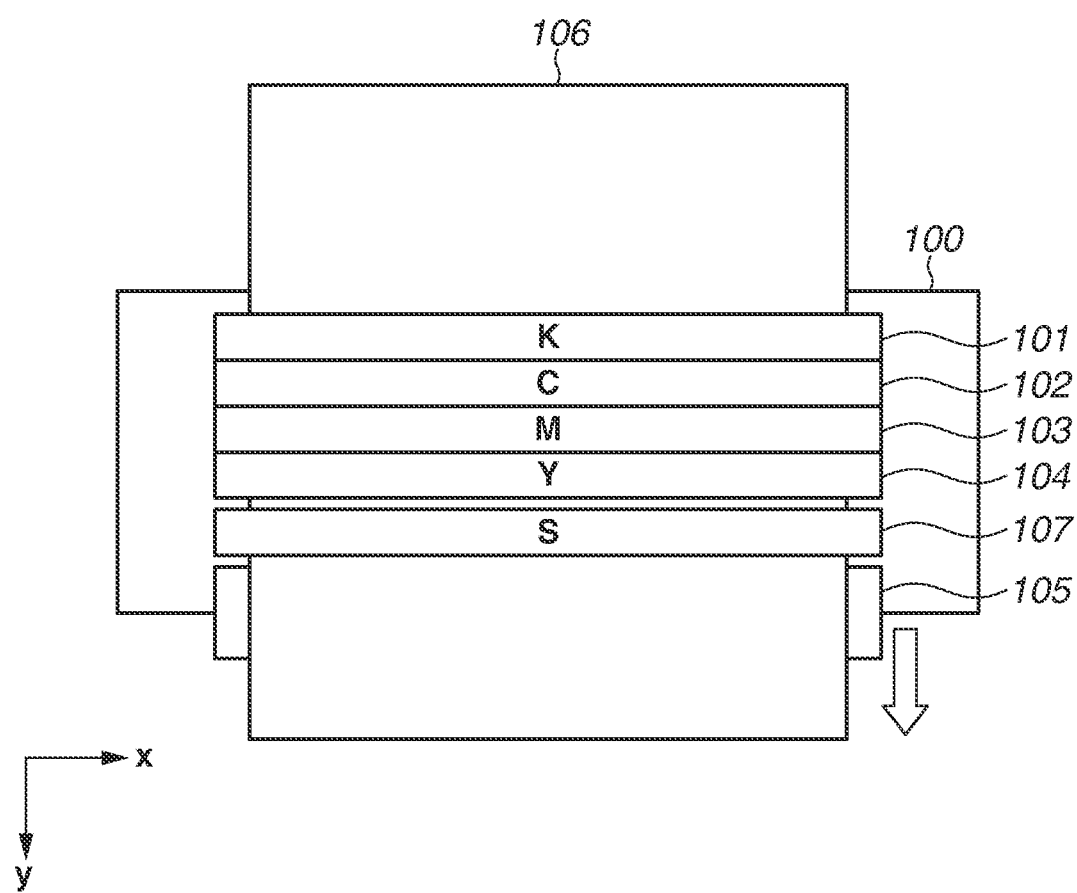
FIG. 1 is a schematic diagram of an inkjet printer according to a first exemplary embodiment of the disclosure.

FIG. 1 is a configuration diagram schematically illustrating an inkjet printer serving as a recording apparatus according to a first exemplary embodiment of the disclosure. The inkjet printer in the first exemplary embodiment is a full-line type recording apparatus, and, as illustrated in FIG. 1, the printer 100 includes recording heads 101 to 104 mounted on a frame serving as a constructional material of the printer 100. Each of the recording heads 101 to 104 includes a nozzle array having a plurality of nozzles for discharging the same type of ink corresponding to the width of a recording medium 106 arranged in a predetermined direction (the x-direction) at a pitch of 1200 dots per inch (dpi). The recording heads 101 to 104 are recording heads configured to apply respective types of ink to a recording medium. The recording head 101 is a recording head corresponding to ink of black (K), which is achromatic ink, and the recording heads 102 to 104 are recording heads corresponding to respective inks of cyan (C), magenta (M), and yellow (Y), which are chromatic inks. These recording heads 101 to 104 are arranged along the y-direction as illustrated in FIG. 1, so that a recording head unit in the first exemplary embodiment is formed.

The recording medium 106 is conveyed in the y-direction by a conveyance roller 105 (and other rollers (not illustrated)) being rotated by a driving force of motor (not illustrated). Then, during a period in which the recording medium 106 is conveyed, ink is discharged from a plurality of nozzles of each of the recording heads 101 to 104 according to recording data, an image for one raster corresponding to a nozzle array of each of the recording heads 101 to 104 is sequentially recorded on the recording medium 106. Moreover, on the downstream side of the recording heads 101 to 104 in the y-direction, a scanner 107 is arranged in such way as to be in parallel to the recording heads 101 to 104. The scanner 107, which has reading elements arranged at a predetermined pitch, is able to read an image recorded by the recording heads 101 to 104 and output the read image as multivalued data for red (R), green (G), and blue (B). In this way, discharging ink from each recording head to a recording medium being conveyed enables recording, for example, an image for one page. Furthermore, a recording apparatus to which the present exemplary embodiment can be applied is not limited to a full-line type apparatus described above. For example, the present exemplary embodiment can be applied to, for example, what is called a serial type recording apparatus, which records an image by moving a recording head or scanner in a scanning manner along a direction intersecting with the direction in which a recording medium is conveyed. Moreover, while, in the first exemplary embodiment, an example in which recording heads are provided for respective ink colors is employed, a configuration in which inks of a plurality of colors are discharged from a single recording head can be employed, or a configuration in which nozzle arrays corresponding to inks of a plurality of colors are arranged on a single discharge substrate can be employed.

Figure 2:
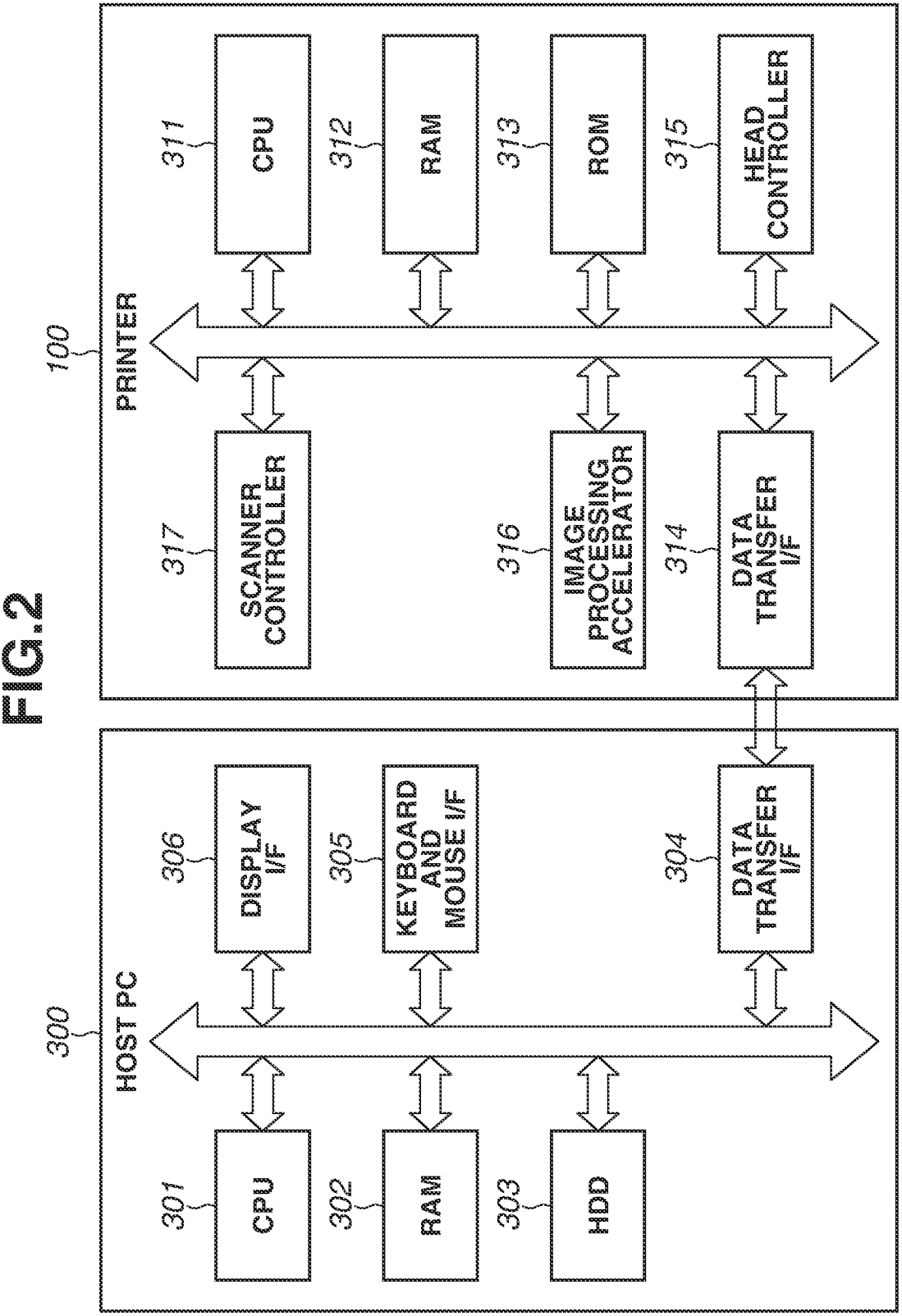
FIG. 2 is a block diagram illustrating a recording system.

FIG. 2 is a block diagram illustrating a recording system according to an exemplary embodiment of the disclosure. As illustrated in FIG. 2, the recording system is configured to include a printer 100 illustrated in FIG. 1 and a personal computer (PC) 300 serving as a host device therefor.

The host PC 300 is configured to mainly include the following elements. A central processing unit (CPU) 301 performs processing corresponding to programs stored in a hard disk drive (HDD) 303 and a random access memory (RAM) 302, each of which serves as a storage unit. The RAM 302, which is a volatile storage, temporarily stores programs or data. The HDD 303, which is a non-volatile storage, also stores programs and data. In the first exemplary embodiment, multi-color shading (MCS) data described below, which is specific to the present exemplary embodiment, is also stored in the HDD 303. A data transfer interface (I/F) 304 controls transmission and reception between the host PC 300 and the printer 100. The connection method for such data transmission and reception to be used can include, for example, Universal Serial Bus (USB), IEEE 1394, and a local area network (LAN). A keyboard and mouse I/F 305 is an I/F used to control human interface devices (HIDs) such as a keyboard and a mouse, enabling the user to perform inputting via the keyboard and mouse I/F 305. A display I/F 306 controls displaying performed by a display (not illustrated).

On the other hand, the printer 100 is configured to mainly include the following elements. A CPU 311 performs processing in each exemplary embodiment described below according to programs stored in a read-only memory (ROM) 313 and a RAM 312. The RAM 312, which is a volatile storage, temporarily stores programs and data. The ROM 313, which is a non-volatile storage, is able to store table data and programs which are used in processing described below.

A data transfer I/F 314 controls transmission and reception of data between the printer 100 and the PC 300. A head controller 315 supplies recording data to each of the recording heads 101 to 104 illustrated in FIG. 1 and controls a discharge operation of each recording head. Specifically, the head controller 315 is configured to able to read control parameters and recording data from predetermined addresses of the RAM 312. Then, when the CPU 311 writes control parameters and recording data into the predetermined addresses of the RAM 312, processing is started up by the head controller 315, so that ink discharge from each recording head is performed. A scanner controller 317 outputs, while controlling individual reading elements of the scanner 107 illustrated in FIG. 1, RGB data obtained from the reading elements to the CPU 311.

An image processing accelerator 316 is hardware which is capable of performing image processing at higher speed than the CPU 311. Specifically, the image processing accelerator 316 is configured to read parameters and data required for image processing from predetermined addresses of the RAM 312. Then, when the CPU 311 writes the parameters and data into the predetermined addresses of the RAM 312, the image processing accelerator 316 is activated, so that predetermined processing is performed on the data. In the first exemplary embodiment, processing for generating parameters for a correction table which is used in an MCS processing unit described below is performed by software executed by the CPU 311. On the other hand, image processing which is performed during recording including processing performed by the MCS processing unit is performed with hardware processing performed by the image processing accelerator 316. Furthermore, the image processing accelerator 316 is not an essential element, and the above-mentioned generation processing for table parameters and image processing can be performed by only processing performed by the CPU 311.

In the above-described recording system, an exemplary embodiment which is configured to reduce a color difference and a frequency difference occurring between areas on a recording medium in a multi-order color image caused by variation in discharge characteristics between nozzles when an image is recorded with use of a plurality of types of ink is described as follows.

Figure 3A:
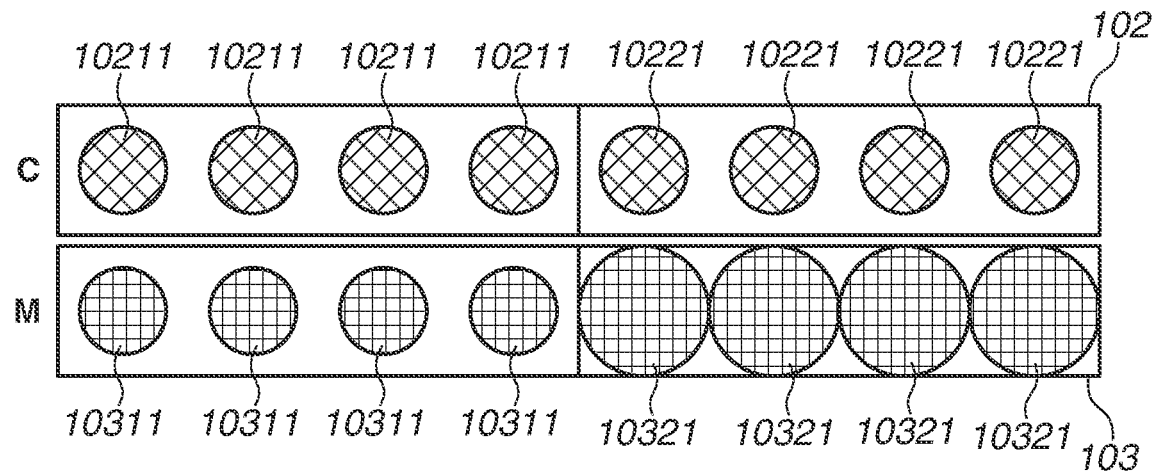
FIGS. 3A, 3B, and 3C are diagrams used to explain color unevenness occurring after head shading (HS) processing.
Figure 3B:
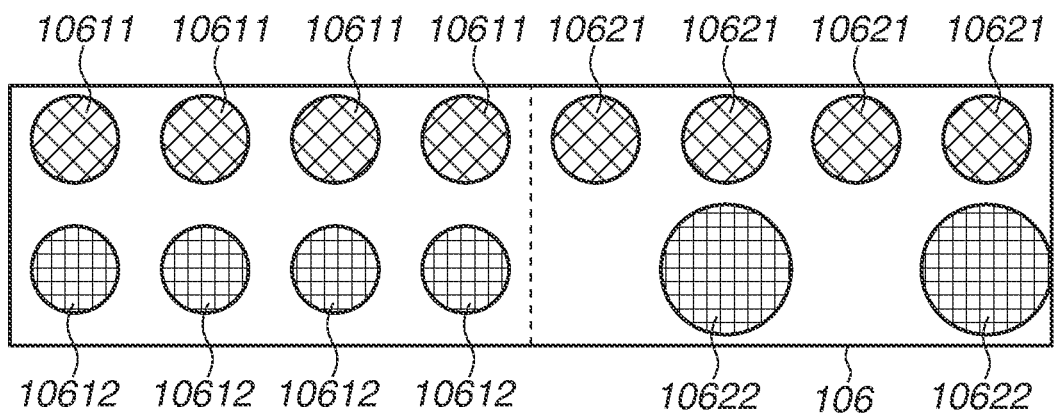
Figure 3C:
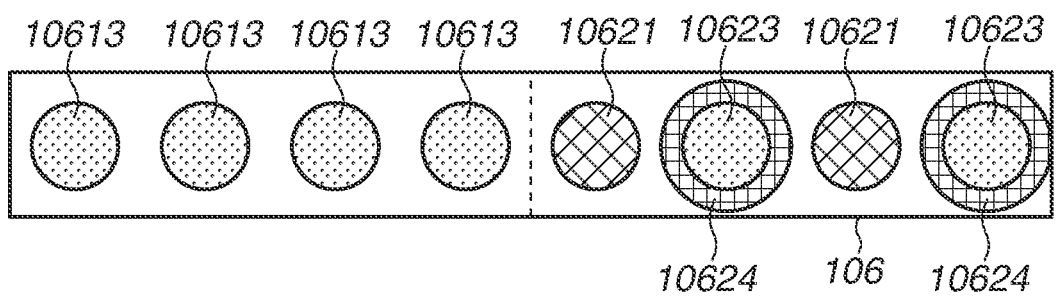

FIGS. 3A, 3B, and 3C are diagrams used to explain a color difference occurring when, with conventional HS processing performed, an image of blue, which is a secondary color expressed by a combination of two colors of ink, has been recorded. Here, the recording medium 106 is divided into a plurality of regions in the x-direction (the horizontal direction in FIGS. 3A to 3C), in which nozzles are arranged, and a color difference occurring between images recorded in the respective areas is described.

FIG. 3A is a diagram illustrating nozzle arrays of the respective recording heads. FIGS. 3B and 3C are diagrams illustrating a state in which a solid image with a duty of 100% has been recorded on the recording medium 106 with use of the nozzles illustrated in FIG. 3A. Here, a recording density (duty) obtained in a case where one ink droplet is applied to one pixel in 1200×1200 dpi is assumed to be 100%. In the recording medium 106, an area in which recording is performed with use of four nozzles located on the left side illustrated in FIG. 3A is referred to as a "first area", and an area in which recording is performed with use of four nozzles located on the right side illustrated in FIG. 3A is referred to as a "second area". Furthermore, while, in FIGS. 3A to 3C, the sizes of the individual nozzles and the sizes of dots recorded by the respective nozzles are illustrated as being respective equal to each other in size, this is intended to express a correspondence between each nozzle and each dot for explanatory convenience and this does not mean that those sizes are actually equal to each other. Moreover, the amount of ink dot per one droplet which is discharged from each nozzle (the discharge amount) also differs by causes other than nozzle diameters. In other words, while different discharge amounts do not necessarily correspond to different nozzle diameters, FIG. 3A illustrates a nozzle with a larger discharge amount by a larger circle for explanatory convenience.

FIG. 3A illustrates a recording head 102 which discharges cyan ink as first ink and a recording head 103 which discharges magenta ink as second ink. In FIG. 3A, for ease of explanation and illustration, only eight nozzles are illustrated out of a plurality of nozzles arranged in each of nozzle arrays in respective recording heads, i.e., a first nozzle array for discharging cyan ink and a second nozzle array for discharging magenta ink. Here, since a color difference in an image of blue, which is a secondary color formed by cyan ink and magenta ink, is explained, only two recording heads for cyan and magenta are illustrated.

All of the eight nozzles 10211 and 10221 of the recording head 102, which discharges cyan ink, are able to discharge a standard amount of ink in a standard direction, so that dots of the same size are recorded at fixed intervals. On the other hand, eight nozzles 10311 and 10321 of the recording head 103, which discharges magenta ink, are able to discharge ink in a standard direction but are different in the discharge amount. Here, the discharge amount of ink from four nozzles 10311 on the left side illustrated in FIG. 3A is assumed to be a standard, and the discharge amount of ink from four nozzles 10321 on the right side illustrated in FIG. 3A is assumed to be larger than the standard. In a case where a recording head which has variation in the discharge amount between nozzles as with the recording head 103 is used, even if images of the same color are recorded on a recording medium, the images may exhibit different colors depending on areas. In the case of the example illustrated in FIG. 3A, in an area in which recording is performed with use of four nozzles on the left side illustrated in FIG. 3A (a first area), magenta dots with the same size as that of cyan dots are recorded. On the other hand, in an area in which recording is performed with use of four nozzles on the right side illustrated in FIG. 3A (a second area), magenta dots larger than the cyan dots are recorded at given intervals equal to those of the cyan dots. As a result, the color of the first area and the color of the second area unfavorably become different from each other.

The case of performing correction of image data using the HS processing with respect to the recording heads 102 and 103 having the above-mentioned discharge characteristics is described. In the above-mentioned example, with respect to the recording head 103, which discharges magenta ink, such a correction as to decrease density is performed on image data corresponding to four nozzles 10321 on the right side, which are large in the discharge amount. Specifically, dot data for determining recording of dots with respect to each area is generated in such a manner that the number of dots to be recorded by the nozzles 10321 becomes smaller than the number of dots to be recorded by the nozzles 10311. Dot data in the first exemplary embodiment is binary data in which recording (1) or non-recording (0) is set.

FIG. 3B is a diagram illustrating the respective areas on the recording medium 106 obtained in a case where the HS processing has been performed on image data about a solid image of blue, which is to be recorded with cyan ink and magenta ink each at a duty of 100%. For ease of explanation, cyan dots and magenta dots are illustrated without being overlapped with each other. FIG. 3B illustrates dots 10611 recorded by the cyan nozzles 10211 and dots 10621 recorded by the cyan nozzles 10221. FIG. 3B further illustrates dots 10612 recorded by the magenta nozzles 10311 and dots 10622 recorded by the magenta nozzles 10321. As an example, a case where the area on a recording medium of a dot formed by an ink droplet discharged from the magenta nozzle 10321 is twice the area on a recording medium of a dot formed by an ink droplet formed by the magenta nozzle 10311 is illustrated. In this case, the number of times of discharge from the magenta nozzles 10321 being set to about half of the number of times of discharge from the magenta nozzles 10311 by the above-mentioned HS processing (here, four dots being changed to two dots) enables making the coverage areas of magenta dots in the respective areas almost equal to each other. In this way, conventional HS processing adjusts the number of ink droplets (i.e., the number of dots) to be applied to each area in such a manner that the densities in respective areas on a recording medium become almost uniform. Furthermore, while the relationship between the coverage area and density is not necessarily a proportionate relationship, in the first exemplary embodiment, an example in which the number of dots having the double area is halved is used for description.

FIG. 3C illustrates the respective areas on a recording medium, and also illustrates dots obtained by overlapping cyan dots and magenta dots illustrated in FIG. 3B with each other. In the first area, cyan dots of the standard size and magenta dots of the standard size are applied to the respective same positions, so that the dots are overlapped with each other to form blue dots 10613 of the standard size. On the other hand, in the second area, cyan dots 10621 formed by cyan dots of the standard size and blue dots formed by cyan dots of the standard size and magenta dots of twice the standard size overlapping each other coexist in a mixed manner. Each of such blue dots formed by cyan dots of the standard size and magenta dots of twice the standard size overlapping each other is formed by a blue area 10623, in which cyan and magenta almost overlap each other, and a magenta area 10624, which is located around the blue area 10623.

As mentioned above, according to conventional HS processing, the number of dots to be recorded is adjusted in such a manner that the sum of areas of the cyan areas (cyan dots) 10621=the sum of areas of the blue areas 10623=the sum of areas of the magenta areas 10624. Therefore, if the color which is observed with the sum of light absorption characteristics of the cyan area 10621 and light absorption characteristics of the magenta area 10624 is equal to the color which is observed with light absorption characteristics of the blue area 10623, the target area appears in almost the same color as the blue area 10623. Thus, a blue image in the first area and a blue image in the second area appear in almost the same color.

However, in the case of forming a multi-order color (mixed color) by superposing a plurality of types of ink on each other as in the blue area 10623, the color which is observed with light absorption characteristics of that area does not coincide with the color which is observed with the sum of light absorption characteristics of the respective areas for a plurality of types of ink. As a result, the entire target area has a color difference occurring with respect to a targeted standard color. In other words, in a case where the surface of the recording medium 106 is divided into a plurality of unit areas, such as a first area and a second area, along the x-direction, as a color difference caused by variation in discharge characteristics of nozzles of the recording head, the color of a blue image in the first area and the color of a blue image in the second area unfavorably become different from each other. Even if HS processing for correcting image data for each ink color is applied, in the case of an image to be recorded with use of inks of two or more colors, a color difference between unit areas may occur as mentioned above, thus leading to a decrease in image quality.

To address such a color difference between unit areas, the first exemplary embodiment performs MCS processing, which performs correction to image data composed of combinations of a plurality of color signals obtained before being subjected to quantization processing. While details of the MCS processing are described below, the MCS processing is able to reduce a color difference which would not be able to be solved by the HS processing.

Figure 8A:
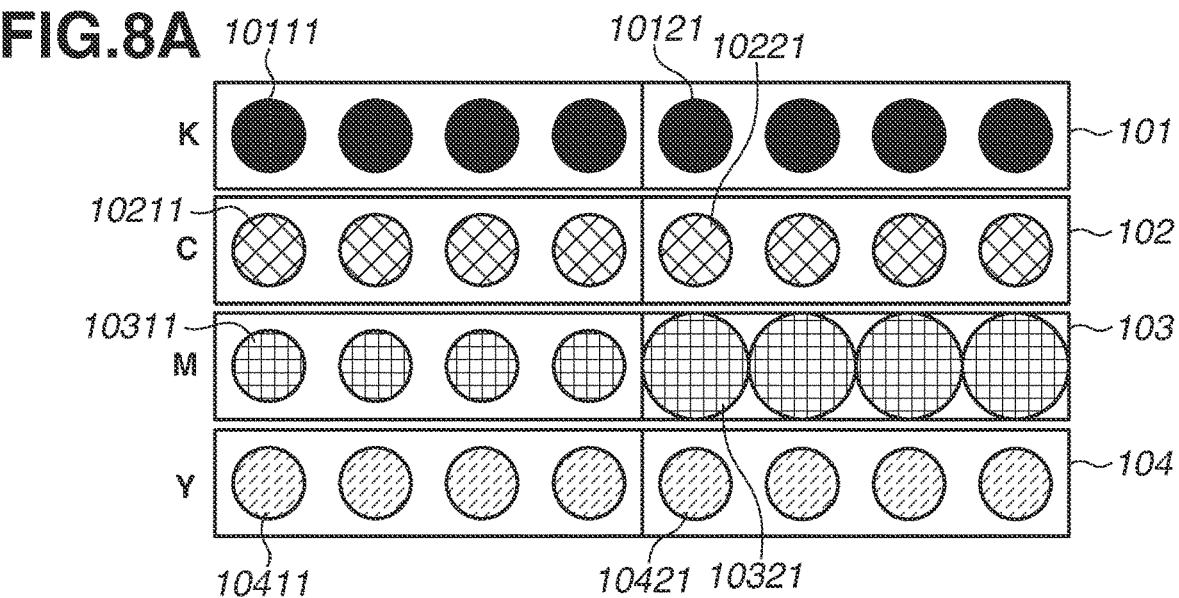
FIGS. 8A, 8B, and 8C are diagrams used to explain a difference in frequency occurring after MCS processing in a conventional example.

Next, an issue on a difference in frequency between unit areas remaining after conventional MCS processing is performed is explained with reference to FIGS. 8A, 8B, and 8C. FIG. 8A is a diagram illustrating the recording heads 101 to 104, and, for ease of explanation and illustration, illustrates only eight nozzles out of a plurality of nozzles arranged in a nozzle array of each recording head.

Out of eight nozzles of the recording head 101, which discharges black ink, both the amount of ink droplet discharged from each nozzle 10111 and the amount of ink droplet discharged from each nozzle 10121 are a standard amount. Similarly, the discharge amount of each of nozzles 10211 and nozzles 10221, which are eight nozzles of the recording head 102, which discharges cyan ink, and nozzles 10411 and nozzles 10421, which are eight nozzles of the recording head 104, which discharges yellow ink, is the standard amount. On the other hand, out of eight nozzles of the recording head 103, which discharges magenta ink, the amount of ink droplet discharged from each of four nozzles 10311 on the left side illustrated in FIG. 8A is the standard amount, and the amount of ink droplet discharged from each of four nozzles 10321 on the right side illustrated in FIG. 8A is larger than the standard amount. While, as with FIG. 3A described above, for ease of explanation, a nozzle the amount of ink droplet discharged from which is larger than the standard amount is illustrated by a circle larger than that of a nozzle the amount of ink droplet discharged from which is the standard amount, actual nozzle diameters do not necessarily have such a relationship.

Figure 8B:
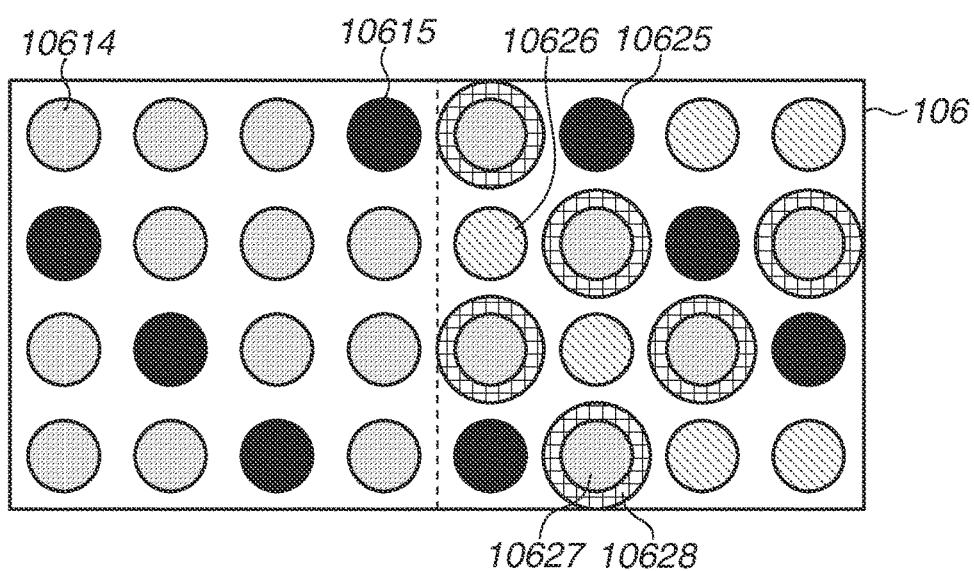

FIG. 8B is a diagram illustrating a result obtained by, after performing HS processing, recording a gray image on the recording medium 106 with use of recording heads having such discharge amount characteristics as those illustrated in FIG. 8A. Here, image data for gray is assumed to be (K, C, M, Y)=(64, 192, 192, 192). The number of magenta dots in the right-hand area (a second area) illustrated in FIG. 8B has been reduced to about half (here, changed from 12 dots to 6 dots) by HS processing. In the first area, gray dots 10614 of the standard size, each of which is formed by three color inks, i.e., cyan ink, magenta ink, and yellow ink, being superposed on each other, and black dots 10615 of the standard size exist. On the other hand, in a second area, which is on the right-hand side illustrated in FIG. 8B, black dots 10625 of the standard size and green dots 10626 of the standard size, each of which is formed by two color inks, i.e., cyan ink and yellow ink, being superposed on each other, exist. Additionally, in the second area, dots each of which is obtained by three color dots, i.e., a cyan dot of the standard size, a yellow dot of the standard size, and a magenta dot of twice the standard size, being superposed on each other exist. Such a dot includes a gray area 10627, which is formed by cyan ink, magenta ink, and yellow ink being superposed on each other, and a magenta area 10628, which is located around the gray area 10627. At this time, as mentioned above with reference to FIGS. 3A to 3C, due to the principle that the color which is observed varies depending on the sum of light absorption characteristics of the respective areas, the color of the first area may differ from the color of the second area.

Figure 8C:
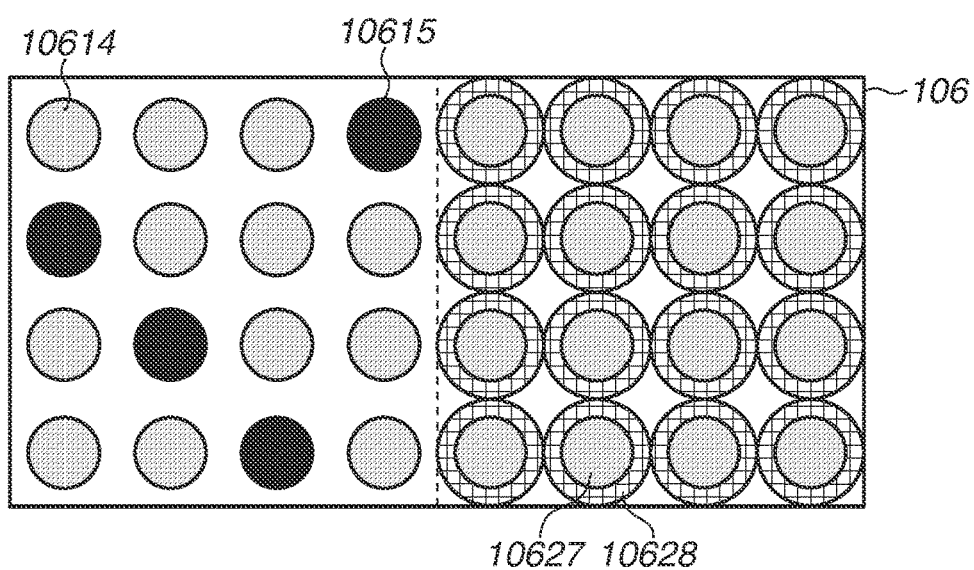

FIG. 8C is a diagram illustrating a state appearing on the recording medium 106 in a case where MCS processing has been performed in consideration of a color difference with respect to image data for recording an image with use of the recording heads 101 to 104 illustrated in FIG. 8A. While the first area on the left-hand side illustrated in FIG. 8C is the same as that illustrated in FIG. 8B, in the second area on the right-hand side illustrated in FIG. 8C, image data for gray has been corrected from (K, C, M, Y)=(64, 192, 192, 192) to (K, C, M, Y)=(0, 255, 255, 255) by MCS processing. Since the numbers of dots in the first area have been adjusted in such a way as to reduce a color difference between the first area and the second area, only gray dots obtained by three color ink dots, i.e., a cyan dot of the standard size, a magenta dot larger than the standard size, and a yellow dot of the standard size, being superposed on each other are formed in the second area. Each gray dot includes a gray area 10627 and a magenta area 10628.

At this time, in the first area on the left-hand side, due to a density difference between the gray spot 10614 of the standard size and the black dot 10615 of the standard size, the surface roughness (granularity) of an image becomes visible. On the other hand, in the second area on the right-hand side, since gray dots are arranged in a uniform manner, the surface roughness of an image is unlikely to become visible. Thus, even if MCS processing is performed to reduce a color difference, a difference in surface roughness may become visible as unevenness by the human eye.

Such a difference in surface roughness is quantifiable as a frequency difference, which occurs due to two areas differing in spatial frequency. FIG. 13 is a diagram quantitatively representing a difference in spatial frequency as a difference in commonly-used granularity evaluation value. The horizontal axis indicates a spatial frequency, meaning that the spatial frequency becomes higher as being closer to the right side. The vertical axis indicates a response value for each frequency. The granularity evaluation value is quantifiable by multiplying a frequency characteristic of a dot pattern by a human visual feature (visual transfer function (VTF)). Furthermore, the human visual feature (VTF) is expressed by using the following Dooley's approximate expression.

$$\text{VTF}=5.05\times\exp(-0.138\times\pi lf/180)\times(1-\exp(-0.1\times lf/180)) \quad (1)$$

Here, "l" denotes an observation distance, and "f" denotes a frequency. A dashed line 1301 and a solid line 1302 illustrated in FIG. 13 represent spatial frequencies of the two areas illustrated in FIG. 8C. In the following description, a value obtained by integrating differences for the respective frequencies is used as a frequency difference between the two areas.

The first exemplary embodiment performs, before performing quantization, correction processing to image data composed of a combination of a plurality of color signals to reduce the above-mentioned difference in color and difference in frequency.

Figure 4A:
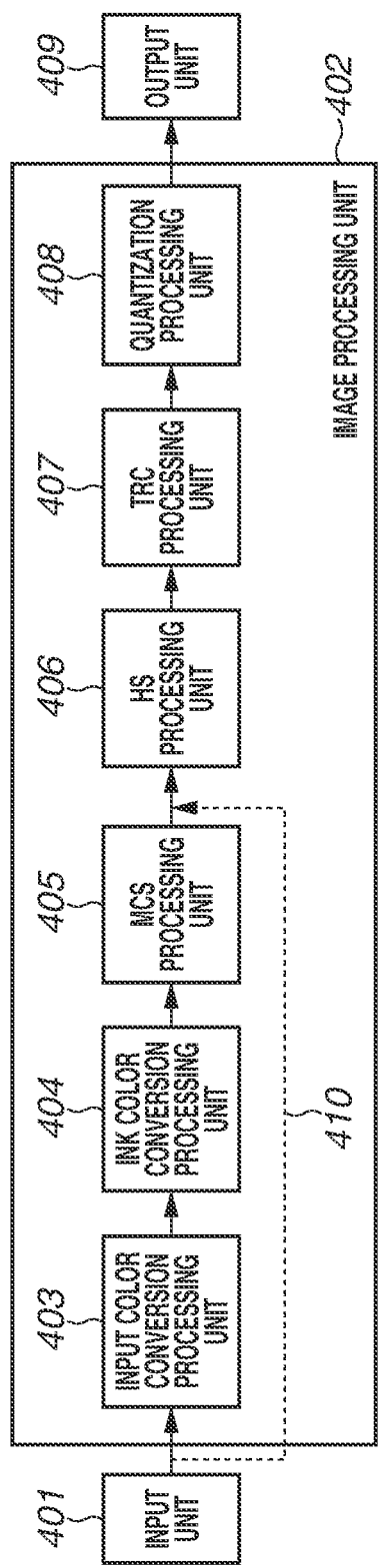

FIG. 4A is a block diagram illustrating a configuration for image processing which the inkjet printer performs according to the first exemplary embodiment, and particularly illustrating an image processing unit which is configured with various elements for control and processing included in the printer 100 illustrated in FIG. 2. Furthermore, the present exemplary embodiment is not limited to this. For example, the image processing unit can be configured with the PC 300 illustrated in FIG. 2, or a part of the image processing unit can be configured with the PC 300 and the other part of the image processing unit can be configured with the printer 100.

Referring to FIG. 4A, an input unit 401 outputs image data received from the host PC 300 to an image processing unit 402. The image processing unit 402 is configured to include an input color conversion processing unit 403, an ink color conversion processing unit 404, a multi-color shading (MCS) processing unit 405, a head shading (HS) processing unit 406, a tone reproduction curve (TRC) processing unit 407, and a quantization processing unit 408.

In the image processing unit 402, first, the input color conversion processing unit 403 converts input image data received from the input unit 401 into image data compatible with a color gamut of the printer. In the first exemplary embodiment, the input image data includes pieces of 8-bit data representing color coordinates (R, G, B) in a color space coordinate system such as sRGB, which is an expression color system of a monitor. The input color conversion processing unit 403 converts such input image data for R, G, and B into image data (R', G', B') in a color gamut of the printer by a known method such as matrix computation processing or processing using a three-dimensional lookup table (LUT). In the first exemplary embodiment, a three-dimensional lookup table (3D LUT) is used in combination with interpolation computation to perform conversion processing. Furthermore, in the first exemplary embodiment, the resolution of each piece of 8-bit image data which is treated by the image processing unit 402 is 600 dpi, and the resolution of binary data which is obtained by quantization processing performed by the quantization processing unit 408 is 1200 dpi as described below.

The ink color conversion processing unit 404 converts pieces of 8-bit image data for R, G, and B processed by the input color conversion processing unit 403 into image data including pieces of color signal data for types of ink for use in the printer. Since the printer 100 in the first exemplary embodiment uses inks of black (K), cyan (C), magenta (M), and yellow (Y), image data for RGB signals is converted into image data including 8-bit color signals for K, C, M, and Y. This color conversion is also performed with use of a three-dimensional lookup table in combination with interpolation computation, as with the above-mentioned input color conversion processing unit 403. Furthermore, as another conversion method, a method such as matrix computation processing can also be used as mentioned above.

The multi-color shading (MCS) processing unit 405 performs conversion processing for correcting a difference in color tone with respect to pieces of 8-bit image data for K, C, M, and Y obtained by conversion performed by the ink color conversion processing unit 404. While details are described below, the MCS processing unit 405 also uses a conversion table (correction table) including a three-dimensional lookup table to perform conversion processing of image data for each unit area. Performing this conversion processing enables reducing a difference in color tone and a difference in frequency caused by variation of discharge characteristics of the respective nozzles of each recording head, which has not been able to be corrected by HS processing. Specific contents of the conversion table for use in the MCS processing unit 405 and conversion processing using the conversion table are described below.

The head shading (HS) processing unit 406 receives pieces of image data for ink color signals and converts pieces of 8-bit image data for respective ink colors into pieces of image data for ink color signals compatible with discharge characteristics of the respective nozzles of each recording head. Thus, this conversion processing is processing similar to the above-mentioned conventional HS processing. In the first exemplary embodiment, the HS processing unit 406 functions as an individual correction unit which uses a one-dimensional lookup table and corrects ink color signals corresponding to respective ink colors individually for each nozzle or for each predetermined number of nozzle groups. Furthermore, the HS processing unit 406 does not necessarily need to be provided. In relation to the memory capacity, depending on specifications of the printer, there is a case where the accuracy of correction processing which is performed by the MCS processing unit 405 is sufficient. In such a case, correction performed by the HS processing unit 406 can be additionally reflected in correction performed by the MCS processing unit 405.

The tone reproduction curve (TRC) processing unit 407 performs correction processing for adjusting the number of ink droplets to be applied from an output unit 409 for respective ink colors with respect to image data including 8-bit ink color signals subjected to HS processing. Usually, the number of dots recorded on a recording medium and the optical density on the recording medium with such a number of dots applied thereto are not in a linear relationship. Accordingly, the TRC processing unit 407 corrects pieces of 8-bit image data to make such a relationship linear, thus adjusting the number of ink droplets to be applied to each unit area on the recording medium.

The quantization processing unit 408 performs quantization processing on pieces of 8-bit 256-valued image data for ink colors which have been processed by the TRC processing unit 407, thus generating quantized data indicating whether to apply ink droplets. In the first exemplary embodiment, first, the quantization processing unit 408 converts the received pieces of image data into pieces of index data for respective ink colors of three bits and five values for "0" to "4". These pieces of index data for "0" to "4" respectively correspond to index patterns in which ink dots the number of which is any of "0" to "4" are to be arranged in two pixels×two pixels with a resolution of 1200 dpi. Furthermore, the quantization processing can be a method of directly converting 8-bit image data into 1-bit binary data (dot data) representing recording "1" or non-recording "0". Moreover, as a quantization processing method, an error diffusion method can be used or other pseudo halftone processing such as a dither method can also be used.

The output unit 409 drives respective recording heads based on the quantized data obtained by the quantization processing and thus discharges inks of respective colors to record an image on the recording medium. In the first exemplary embodiment, the output unit 409 is configured with a recording mechanism including the recording heads 101 to 104 illustrated in FIG. 1.

Figure 5A:
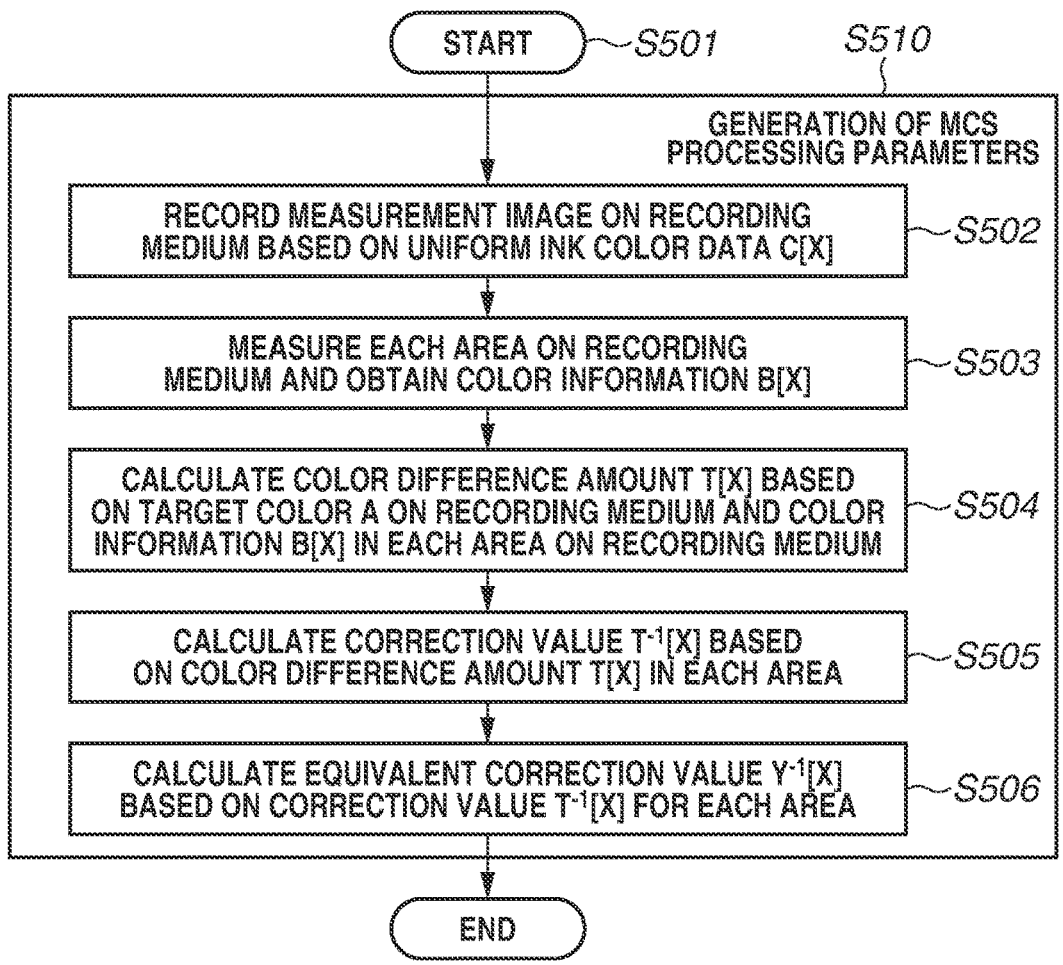
FIGS. 5A and 5B are flowcharts of a table parameter generation process and an image processing process, respectively.
Figure 5B:
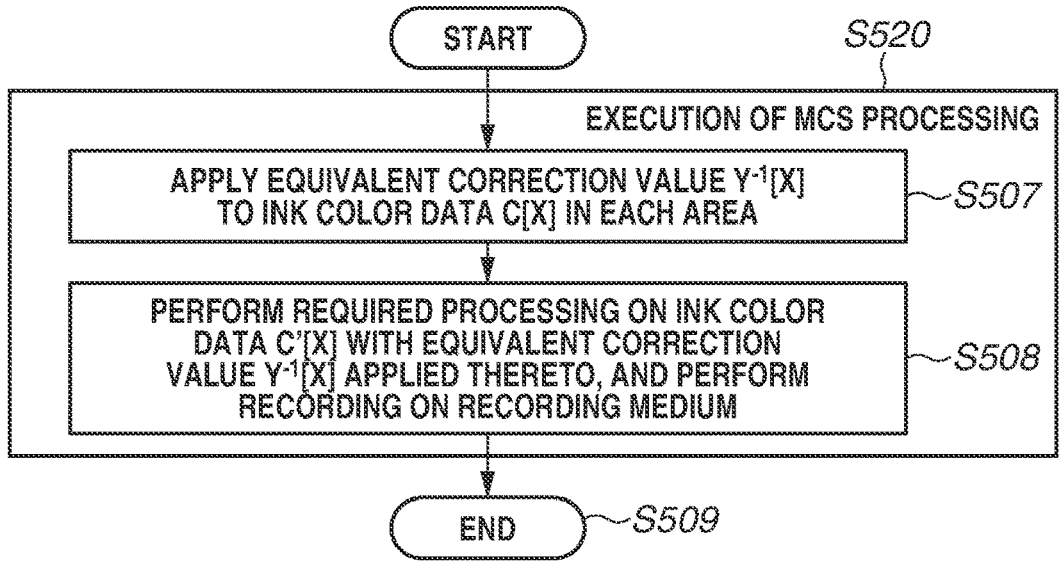

FIGS. 5A and 5B are flowcharts respectively illustrating a process for generating parameters in a table which is used by the MCS processing unit 405 illustrated in FIG. 4A and a process for performing image processing using parameters which have been generated at the time of actual recording.

Specifically, FIG. 5A is a flowchart illustrating respective steps which the CPU 311 performs to generate parameters in a conversion table, which is a three-dimensional lookup table for use in the MCS processing unit 405. In the first exemplary embodiment, such parameter generation processing is requisitely or selectively performed at the time of manufacturing of the printer, when the printer has been used for a predetermined time period, or when the printer has performed a predetermined amount of recording. This processing can be performed, for example, before a recording operation each time recording is performed and thus can be performed as what is called a calibration. With this processing, table parameters in the conversion table are updated.

FIG. 5B is a flowchart illustrating a process for the MCS processing unit 405, which the image processing accelerator 316 performs to generate recording data for use in recording by the printer as part of image processing to be performed by the image processing unit 402 illustrated in FIG. 4A.

First, the processing for generating table parameters illustrated in FIG. 5A is described. In the first exemplary embodiment, table parameters for use in the MCS processing unit 405 are generated on the premise that table parameters for use in the HS processing unit 406 have previously been generated. Therefore, at the time point of step S501, in which the present processing is started, table parameters for use in the HS processing unit 406 have already been generated (updated) by a known method. In generation of table parameters for use in the HS processing unit 406, processing for reducing variation in density on a recording medium is performed for each ink color. For example, with regard to a nozzle the amount of ink droplet discharged from which is large, i.e., a nozzle the discharge amount of which is large, parameters are generated in such a way as to decrease the number of times of discharge, and, with regard to a nozzle the amount of ink droplet discharged from which is small, i.e., a nozzle the discharge amount of which is small, parameters are generated in such a way as to increase the number of times of discharge. For example, with regard to the nozzle 10321 of the recording head 103 for discharging magenta ink illustrated in FIG. 3A, such parameters as to reduce the number of dots to about half are generated, as illustrated in FIG. 3B. Moreover, with regard to the recording head 102 for discharging cyan ink, such parameters as not to change the number of dots are generated, as illustrated in FIG. 3B. As mentioned above, in the first exemplary embodiment, when table parameters for use in the MCS processing unit 405 are intended to be generated or updated, prior to that generation, table parameters for use in the HS processing unit 406 have to be completed. With this procedure, a test pattern for generating parameters for use in the MCS processing unit 405 is recorded based on data subjected to HS processing. As a result, a difference in color tone caused by variation in discharge characteristics between nozzles is able to be appropriately reduced by total processing performed by the MCS processing unit 405 and the HS processing unit 406.

When the table parameter generation processing for the MCS processing unit 405 is started, first, in step S502, the CPU 311 causes all of the nozzles of the respective recording heads illustrated in FIG. 1 to discharge ink to record a measurement image (test pattern) on a recording medium. Out of pieces of image data represented by combinations of (K, C, M, Y) input to the MCS processing unit 405, with respect to each combination of (K, C, M, Y) representing a color in which the tendency of the above-mentioned color shift becomes large, the CPU 311 causes all of the nozzles of the respective recording heads to discharge ink to record a measurement image. Specifically, the CPU 311 divides signal values of 0 to 255 into, for example, 17 equal parts with respect to each of components (K, C, M, Y) of an ink color space, and records patch images corresponding to all of the combinations (grid points) of 17×17×17 patterns. Moreover, to reduce memory and processing time, out of the above-mentioned grid points, the CPU 311 can select grid points in which the color shift caused by discharge characteristics tends to change particularly significantly and record patch images with respect to only the combinations of (K, C, M, Y) corresponding to the selected grid points. With regard to grid points of a color in which the tendency of the color shift becomes large, for example, the CPU 311 is able to select colors for which to record patch images, by previously selecting colors having a large color difference, such as (K, C, M, Y)=(0, 255, 255, 0) corresponding to a blue image described with reference to FIGS. 3A to 3C. Moreover, the CPU 311 can also record patch images with respect to colors having a color difference larger than a predetermined value and perform such selection depending on a computation load or memory capacity.

In the first exemplary embodiment, with regard to measurement image data (K, C, M, Y) used for recording a measurement image, the resolution of a plurality of pixels constituting the measurement image data is 600 dpi. Moreover, data for the plurality of pixels is data representing a uniform color due to the combinations of (K, C, M, Y) values of the corresponding measurement image data being the same. Such image data (K, C, M, Y) for the measurement image is assumed to be 8-bit ink color data C[X]. Referring to FIG. 4A, the ink color data C[X] is input to the HS processing unit 406 via a bypass processing path indicated by a dashed line 410 without being subjected to processing performed by the input color conversion processing unit 403, the ink color conversion processing unit 404, and the MCS processing unit 405. After that, the ink color data C[X] becomes measurement image data configured as quantized data illustrated in FIG. 3B via the HS processing unit 406, the TRC processing unit 407, and the quantization processing unit 408, and the measurement image data is then recorded on the recording medium 106 by the output unit 409. In the following description, for ease of explanation, only table parameters corresponding to grid points representing image data for a blue measurement image are described with respect to generation processing therefor.

In ink color data C[X], X denotes a value for specifying a predetermined pixel area in measurement image data at a resolution of 600 dpi. For example, X indicates a pixel area such as the above-mentioned first area and second area each of which corresponds to four contiguous nozzles illustrated in FIG. 3A. Then, X is specified with one pixel in 300 dpi used as a unit. The resolution of dots on a recording medium is 1200 dpi because of corresponding to the arrangement resolution 1200 dpi of nozzles. Accordingly, portions corresponding to two pixels of ink color data C[X] with a resolution of 600 dpi are associated with one area, which is thus specified by X. As mentioned above, a measurement image is recorded by the output unit 409 based on the ink color data C[X] subjected to processing performed by the HS processing unit 406 and the subsequent units.

Figure 6A:
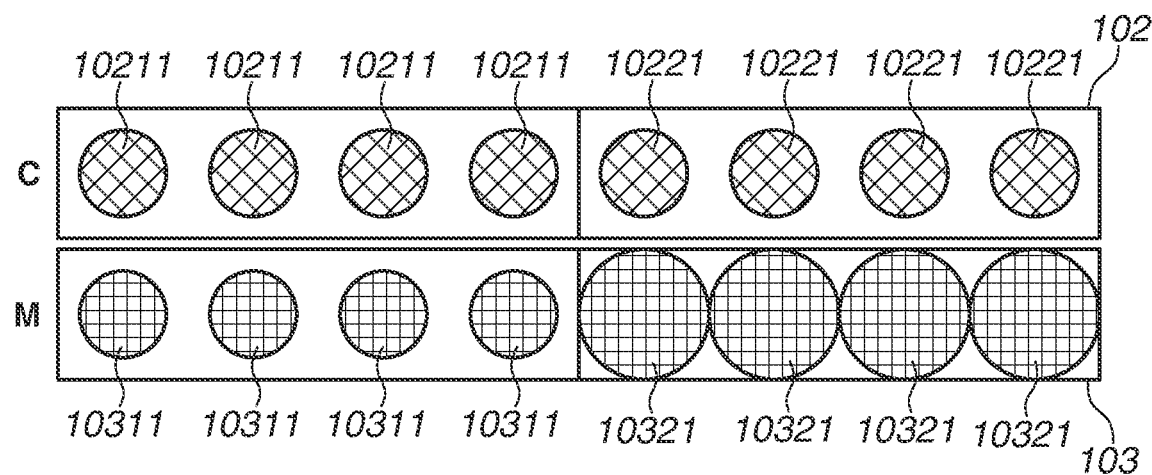
FIGS. 6A and 6B are diagrams used to explain color unevenness occurring after HS processing.
Figure 6B:
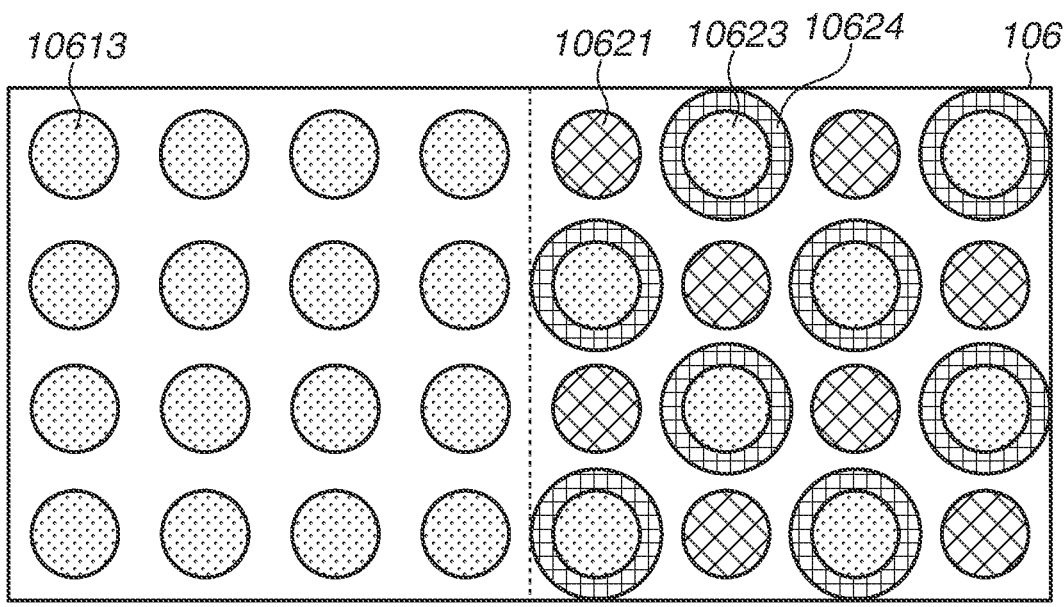

FIGS. 6A and 6B are diagrams used to explain the recorded state of the measurement image obtained in the above-mentioned step S502. In FIGS. 6A and 6B, elements similar to the elements illustrated in FIGS. 3A to 3C are assigned the respective same reference numerals and the description thereof is not repeated.

FIG. 6A illustrates a case where, as with FIG. 3A, out of the nozzles of the recording head 103, which discharges magenta ink, four nozzles corresponding to the second area have a discharge amount larger than the standard discharge amount. Accordingly, as image data (K, C, M, Y)=(0, 255, 255, 0) representing blue is subjected to HS processing, a measurement image of blue, which is a secondary color, such as that illustrated in FIG. 6B is recorded. Thus, a color difference occurs in the second area, which includes nozzles having a discharge amount larger than the standard discharge amount, so that a color different from the standard blue in the first area is recorded.

The description refers back to FIG. 5A. In step S503, the CPU 311 causes the scanner 107 to measure the measurement image recorded on the recording medium 106 in step S502, and thus obtains color information B[X] (RGB data) corresponding to each area X.

Furthermore, in the first exemplary embodiment, the resolution of the scanner 107, i.e., the arrangement pitch of reading elements arranged in the scanner 107, is not particularly limited. The resolution of the scanner 107 can be a resolution higher than or a resolution lower than the recording resolution 1200 dpi of each recording head. Moreover, the scanner 107 can not necessarily be of the full line type, which is similar to that of each recording head, such as that illustrated in FIG. 1, but can be of the serial type, in which the scanner 107 performs measurement with a predetermined period while moving along the x-direction illustrated in FIG. 1. Moreover, the scanner 107 can be a scanner prepared separately from the printer. In that case, the scanner and the printer can be interconnected by signal connection, and a measurement result can be automatically input from the scanner to the printer. Additionally, the color information B[X] does not necessarily need to be RGB information, but can be any format of information such as L*a*b* measured by a colorimeter. In whatever form or at whatever resolution the measurement is performed, as long as a measurement result B[X] of an area corresponding to four nozzles is able to be appropriately obtained by performing various processing operations such as averaging, any measurement method can be applied to the first exemplary embodiment.

A measurement image for blue of a grid point the ink color data C[X] of which is (K, C, M, Y)=(0, 255, 255, 0) is recorded by the recording heads 102 and 103, which discharge cyan ink and magenta ink, respectively, illustrated in FIG. 1. Then, color information B[X] is acquired by the scanner 107 in each area (each unit area) corresponding to each nozzle group (in the first exemplary embodiment, four nozzles).

FIG. 6B illustrates part of the areas, in which the left-hand side in FIG. 6B is referred to as a first area (X=1) and the right-hand side in FIG. 6B is referred to as a second area (X=2). Then, color information about the first area is expressed by B[1]=(R1, G1, B1), and color information about the second area is expressed by B[2]=(R2, G2, B2). Furthermore, an example illustrated in the second area on the right-hand side in FIG. 6B indicates a case where four nozzles for discharging magenta ink have a discharge amount larger than the standard discharge amount. For example, there naturally can be a case where, out of four nozzles, three nozzles have a discharge amount larger than the standard discharge amount and the other one nozzle has the standard discharge amount, and, in that case, naturally, the value of color information B[2] about the second area to be acquired is different from that in the example illustrated in FIG. 6B.

Next, in step S504, the CPU 311 calculates a color difference amount T[X] of each area [X] based on a target color A=(Rt, Gt, Bt) and the color information B[X] acquired in step S503. Here, the target color A is a measured value obtained by measuring an image recorded with use of a recording head the discharge amount of which is the standard discharge amount, based on a signal value (K, C, M, Y)=(0, 255, 255, 0). Actually, a value obtained by measuring, with the scanner 107, an image recorded with use of nozzles having the standard discharge amount can be employed. Since, as mentioned above, in the first exemplary embodiment, the resolution of color data obtained by measurement is set to 300 dpi, in step S504 and even in step S505 and step S506 described below, the CPU 311 processes data the pixel resolution of which is 300 dpi.

Here, the color difference amount T[X], which indicates a difference in color, can be expressed as follows.

Color difference amount $T[1]=B[1]-A=(R1-Rt, G1-Gt, B1-Bt)$

Color difference amount $T[2]=B[2]-A=(R2-Rt, G2-Gt, B2-Bt)$

In the example illustrated in FIG. 6B, since the discharge amounts for cyan ink and magenta ink discharged to the first area on the left-hand side in FIG. 6B are equal to the standard discharge amount, R1=Rt, G1=Gt, and B1=Bt. Accordingly, the color difference amount becomes T[1]=0.

On the other hand, since, while the discharge amount for cyan ink discharged to the second area is the standard discharge amount, the discharge amount for magenta ink is larger than the standard discharge amount, the measured values are different from the values of the target color (Rt, Gt, Bt). For example, blue observed with a combination of a blue area 10623 and a magenta area 10624 is assumed to have a strong tendency toward magenta color as compared with the target blue color. At this time, the color difference amount T[2] becomes a color difference amount in which magenta color is larger, and is expressed by, for example, relationships of R2=Rt, G2<Gt, and B2=Bt.

In step S505, the CPU 311 calculates a correction value $T^{-1}[X]$ based on a color difference amount T[X] of each area [X]. In the first exemplary embodiment, the CPU 311 easily obtains, with use of an inverse conversion formula, a correction value for use in conversion as $T^{-1}[X]=-T[X]$. Accordingly, the respective correction values for the first area and the second area are as follows.

Correction value $T^{-1}[1]=-T[1]=A-B[1]=(Rt-R1, Gt-G1, Bt-B1)$

Correction value $T^{-1}[2]=-T[2]=A-B[2]=(Rt-R2, Gt-G2, Bt-B2)$

Here, since T[1]=0, the correction value for the first area is $T^{-1}[1]=0$. On the other hand, since, in the case of G2<Gt, "Gt−G2" becomes a positive value, the correction value for the second area becomes a value for decreasing magenta color.

In step S506, the CPU 311 calculates an equivalent correction value $Y^{-1}[X]$ from the correction value $T^{-1}[X]$ for each area. Since the correction value $T^{-1}[X]$ is a correction value for blue color in a measurement color space, the CPU 311 calculates, based on the correction value $T^{-1}[X]$, an equivalent correction value $Y^{-1}[X]$ for correcting blue color in an ink color space. With regard to the first area, since the correction value in the measurement color space is $T^{-1}[1]=0$, the equivalent correction value in the ink color space is also $Y^{-1}[1]=0$. On the other hand, with regard to the second area, the equivalent correction value $Y^{-1}[2]$ becomes a value not 0, so that, in the present example, a correction value for decreasing magenta color is obtained.

If, for instance, the measurement color space and the ink color space are able to be linearly converted into each other, the respective equivalent correction values can be obtained by using a known method such as matrix conversion as expressed in the following formula (2) and formula (3).

$$Y^{-1}[1] = \begin{vmatrix} C1 \\ M1 \\ Y1 \\ K1 \end{vmatrix} = \begin{vmatrix} a1 & a2 & a3 \\ a4 & a5 & a6 \\ a7 & a8 & a9 \\ a10 & a11 & a12 \end{vmatrix} \times \begin{vmatrix} Rt-R1 \\ Gt-G1 \\ Bt-B1 \end{vmatrix} \quad (2)$$

$$Y^{-1}[2] = \begin{vmatrix} C2 \\ M2 \\ Y2 \\ K2 \end{vmatrix} = \begin{vmatrix} a1 & a2 & a3 \\ a4 & a5 & a6 \\ a7 & a8 & a9 \\ a10 & a11 & a12 \end{vmatrix} \times \begin{vmatrix} Rt-R2 \\ Gt-G2 \\ Bt-B2 \end{vmatrix} \quad (3)$$

Here, a1 to a12 are conversion coefficients used to convert the measurement color space into the ink color space.

Since the color difference amount T[X] is a three-dimensional vector and the equivalent correction value $Y^{-1}[X]$ is a four-dimensional vector, usually, each of the conversion coefficients a1 to a12 does not necessarily have a unique solution. The resolution not being unique barely matters in a case where ink color data C[X] indicates an outermost color in the color reproduction range such as blue of (K, C, M, Y)=(0, 255, 255, 0). On the other hand, in a case where ink color data C[X] indicates a color away from the outermost portion of the color reproduction range such as gray of (K, C, M, Y)=(64, 192, 192, 192), there may occur an issue with color unevenness arising from frequencies. For example, increasing the amount of K while decreasing the amounts of C, M, and Y enables obtaining a plurality of combinations of types of ink which is able to express the same gray color. At this time, color unevenness which becomes visible due to frequencies may occur from the principle of occurrence of a frequency difference described above with reference to FIG. 8C.

Therefore, the first exemplary embodiment provides the following constraint with respect to the conversion coefficients a1 to a12.

$a10=0, a11=0, a12=0$

This constraint means that the equivalent correction value for K ink is always set to 0. Thus, a color difference between areas is corrected by adjusting the values of three colors of C ink, M ink, and Y ink. K ink is the highest in density of K, C, M, and Y inks, and has a significant influence on frequencies of an image. With respect to such K ink, providing a constraint not to change the number of dots enables preventing or reducing the occurrence of color evenness which becomes visible due to frequencies.

Furthermore, in a case where linear conversion is not able to be performed between the measurement color space and the ink color space, the respective equivalent correction values can be obtained by using a known method such as a three-dimensional lookup table method as follows.

$Y^{-1}[1]=H(Rt-R1, Gt-G1, Bt-B1)$ $Y^{-1}[2]=H(Rt-R2, Gt-G2, Bt-B2)$

Here, H is a function used to convert the measurement color space into the ink color space, and the conversion relationship in the lookup table is defined according to the function H. In the first exemplary embodiment, even in generating such a lookup table, designing is performed in such a manner that the correction amount for K is set to 0 and the values of C, M, and Y are adjusted.

Moreover, in a case where the relationship between the correction value $T^{-1}[X]$ and the equivalent correction value $Y^{-1}[X]$ differs depending on colors, the respective equivalent correction values can also be similarly obtained by using a known method such as a three-dimensional lookup table method as follows.

$Y^{-1}[1]=H(Rt, Gt, Bt)-H(R1, G1, B1)$ $Y^{-1}[2]=H(Rt, Gt, Bt)-H(R2, G2, B2)$

Here, H is a function used to convert the measurement color space into the ink color space, and the function H is designed in such a manner that the correction amount for K is set to 0 and the values of C, M, and Y are adjusted.

With the above-mentioned method used, with respect to grid points selected as a color the color tone of which greatly changes, the CPU 311 obtains table parameters serving as grid point data for each area [X] corresponding to a nozzle group including one nozzle or a predetermined number of contiguous nozzles. Moreover, with respect to grid points other than the above-mentioned selected grid points, the CPU 311 obtains table parameters by performing interpolation between the above-mentioned selected grid points. The method of interpolation used at this time can be a known method, the description of which is omitted. Furthermore, the equivalent correction value $Y^{-1}[X]$, which is a table parameter of each grid point as calculated, is stored in the HDD 303 of the host PC 300 or a non-volatile memory provided in the printer 100 for each area [X] in association with the corresponding grid point. In either case, it is favorable that table parameters are treated in such a way as not to be lost, for example, at the timing of power-off.

FIGS. 9A and 9B illustrate examples of equivalent correction values $Y^{-1}[1]$ and $Y^{-1}[2]$, which are conversion table parameters for use in MCS processing in the first exemplary embodiment. The equivalent correction value $Y^{-1}[X]$ is a four-dimensional lookup table with (K, C, M, Y) used as input values, in which the correction amounts for the input values of (K, C, M, Y) are stored.

Next, a process of processing which the MCS processing unit 405 performs, illustrated in FIG. 5B, is described. The present process is part of a process which the image processing accelerator 316 performs in a series of image processing operations performed by the respective processing units illustrated in FIG. 4A at the time of a normal recording operation. The MCS processing unit 405 corrects image data using a three-dimensional lookup table prepared for each area, which includes the correction values obtained as mentioned above as grid point data.

First, in step S507, the MCS processing unit 405 performs correction to ink color data C[X] by applying thereto an equivalent correction value $Y^{-1}[X]$, which is a table parameter for the MCS processing unit 405, generated in the above-described way.

Here, first, the MCS processing unit 405 determines in which area out of the above-mentioned areas [X] a pixel of interest targeted for image processing is included, i.e., determines the value of X. Here, the resolution of pixels in the image processing is 600 dpi, and each area [X] is specified by a portion corresponding to four nozzles in the arrangement pitch of 1200 dpi, i.e., the resolution of 300 dpi. Accordingly, two pixels correspond to one area [X].

Upon obtaining the value X=n of the area [X] in which the pixel of interest is included, the MCS processing unit 405 refers to a conversion table generated in association with the area [n], thus being able to acquire an equivalent correction value $Y^{-1}[n]$ from a combination of (K, C, M, Y) indicated by data about the pixel of interest. For example, in a case where image data about the pixel of interest indicates a blue image of (K, C, M, Y)=(0, 255, 255, 0), the MCS processing unit 405 is able to obtain an equivalent correction value Y-[n] corresponding to the area [n] as mentioned above. Then, the MCS processing unit 405 performs correction to image data about the pixel of interest by applying the equivalent correction value $Y^{-1}[n]$ thereto. Specifically, the MCS processing unit 405 applies an equivalent correction value $Y^{-1}[X]$ to ink color data C[X] corresponding to the area [X] in which the pixel of interest is included, according to the following formulae, thus generating corrected ink color data C'[X].

Ink color data $C'[1]=C[1]+Y^{-1}[1]$

Ink color data $C'[2]=C[2]+Y^{-1}[2]$

Here, in the example of a blue image illustrated in FIG. 6B, a correction value corresponding to the first area [1] on the left-hand side in FIG. 6B is $Y^{-1}[1]=$. Accordingly, the corrected ink color data C'[1] is a value indicating blue which is the same as the target color A. On the other hand, a correction value $Y^{-1}[2]$ corresponding to the second area [2] on the right-hand side in FIG. 6B is a correction value to decrease cyan color. Accordingly, ink color data C'[2] corrected by MCS processing becomes a value indicating blue in which cyan color is decreased relative to the target color A.

Next, in step S508, the ink color data corrected in the above-described way is then subjected to the respective processing operations by the HS processing unit 406, the TRC processing unit 407, and the quantization processing unit 408, and the obtained quantized data is output the output unit 409, so that an image is recorded on the recording medium 106.

Figure 7A:
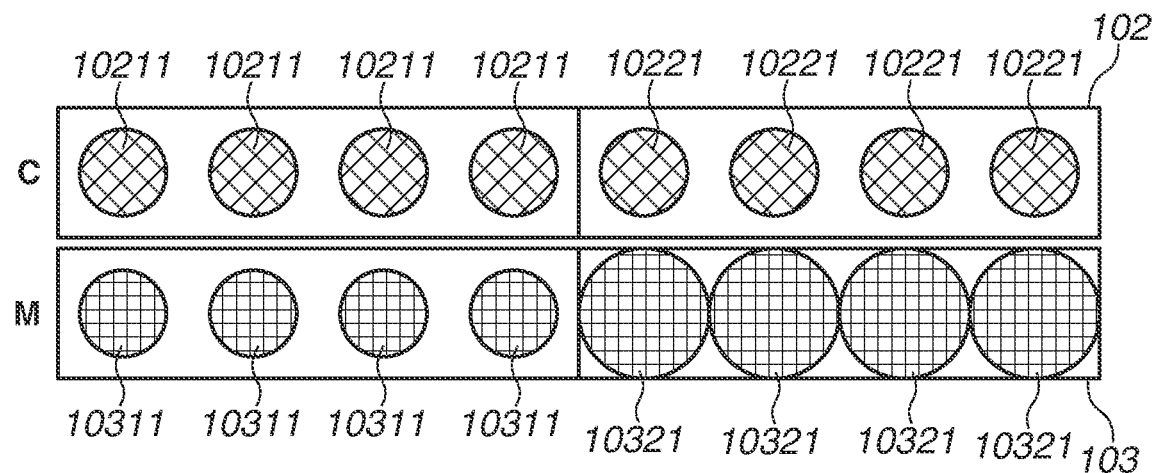
FIGS. 7A and 7B are diagrams used to explain color unevenness caused by multi-color shading (MCS) processing.
Figure 7B:
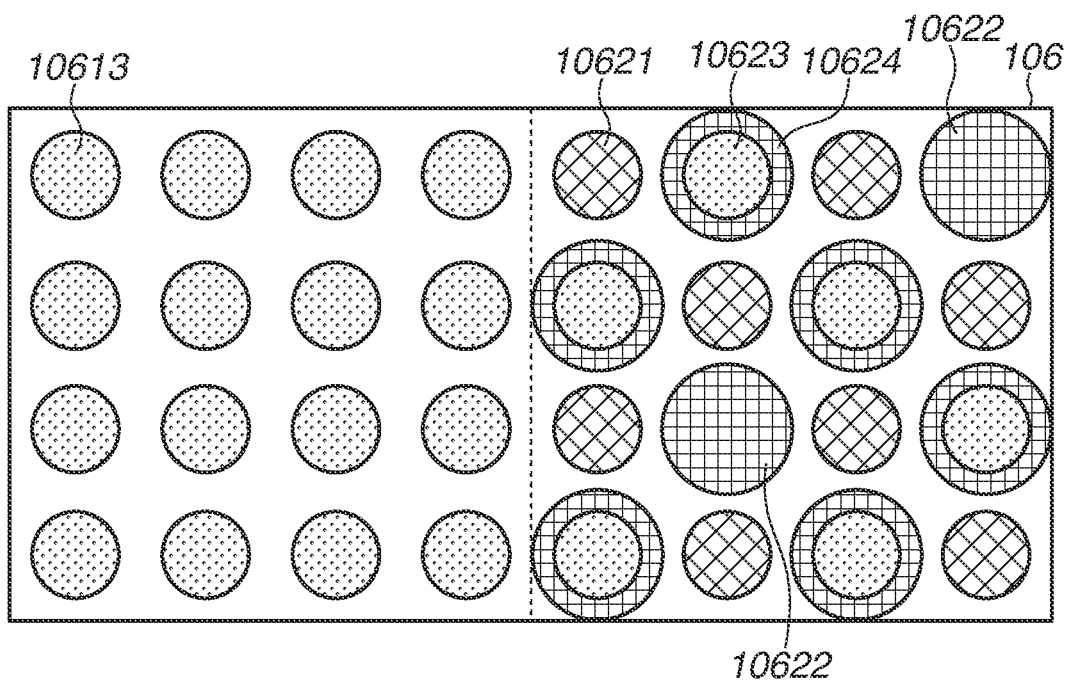

FIGS. 7A and 7B are diagrams used to explain a reduction in color unevenness by MCS processing, with respect to an image of (K, C, M, Y)=(0, 255, 255, 0) recorded in step S508. FIG. 7A illustrates, as with FIG. 6A, the discharge amount characteristics of the respective nozzles of the recording head 102, which discharges cyan ink, and the recording head 103, which discharges magenta ink. FIG. 7B is a diagram illustrating a case where correction by MCS processing has been performed to such discharge amount characteristics. In the second area on the right-hand side in FIG. 7B, dots which do not overlap with any cyan dot, such as magenta dots 10622, exist. The magenta dots 10622 exist at portions to which a magenta dot and a cyan dot would be applied in an overlapping manner in a recording result subjected to HS processing illustrated in FIG. 6B. Accordingly, according to MCS processing in the first exemplary embodiment, ink color data C'[2] is subjected to processing for decreasing cyan color relative to the target color A, so that a result of such processing indicates that the number of cyan dots has decreased.

Here, in each area illustrated in FIG. 7B, a color difference amount T[X] caused by, for example, variation in discharge amount occurs at the time of recording. Here, actual color appearance of first area color on a recording medium corresponding to C'[1]+color difference amount T[1]≈target color A, and actual color appearance of second area≈color on a recording medium corresponding to C'[2]+color difference amount T[2]≈target color A.

C'[1] is a blue color which is the same as the target color A, and the color difference amount T[1]=0. Moreover, C'[2] is a blue color in which a cyan color equivalent to the color difference amount T[2] has decreased relative to the target color A, and the color difference amount T[2] is a color difference amount to increase a cyan color. In this way, blue colors of the first area and the second area become approximately the same color, so that color unevenness caused by a difference in color tone is reduced.

Figure 10A:
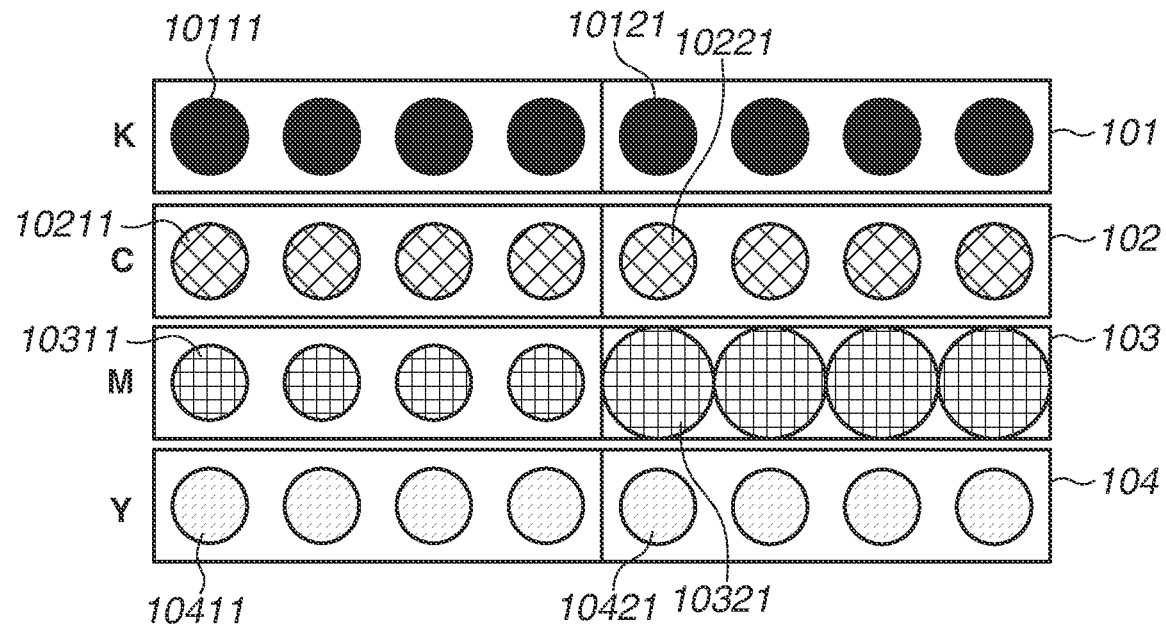
FIGS. 10A and 10B are diagrams used to explain a reduction of color unevenness due to a difference in frequency caused by MCS processing.
Figure 10B:
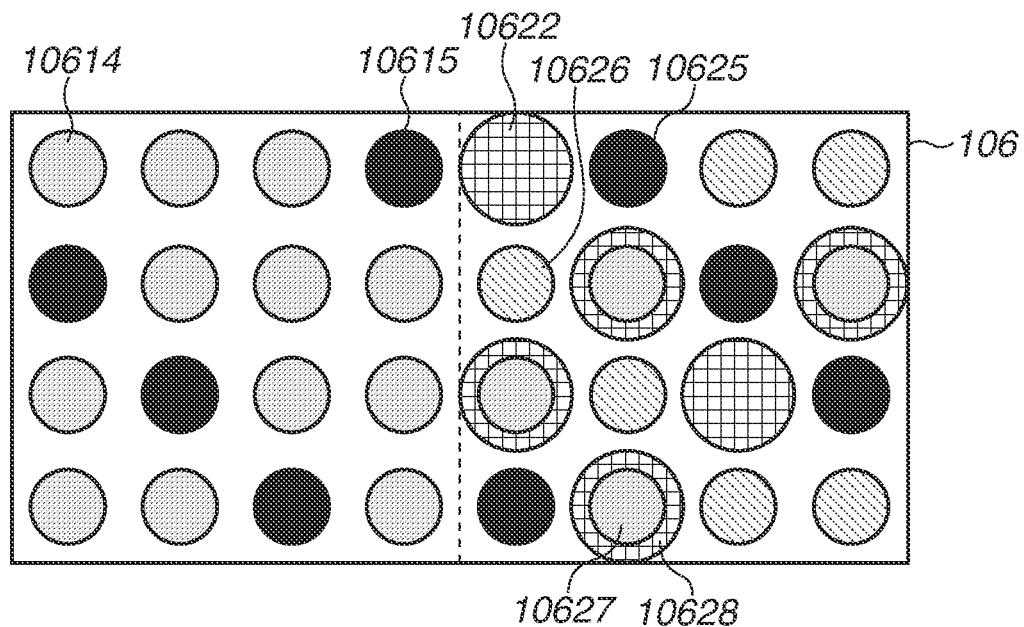

FIGS. 10A and 10B are diagrams used to explain a reduction in color unevenness caused by a difference in frequency by MCS processing, with respect to an image of (K, C, M, Y)=(64, 192, 192, 192) recorded in step S508.

FIG. 10A illustrates, as with FIG. 8A, the discharge amount characteristics of the respective nozzles in the recording heads 101 to 104 for black, cyan, magenta, and yellow.

As a result obtained by the MCS processing unit 405 performing the above-described correction in the first exemplary embodiment, black dots 10625 exist in the second area on the right-hand side in FIG. 10B. The number of black dots 10625 in the second area is the same as the number of dots 10615 in the first area on the right-hand side. Moreover, in the second area, dots each of which does not overlap with any other color dot, such as magenta dots 10622, and green dots 10626 each obtained by a cyan dot and a yellow dot of the standard size superposed on each other exist. This means that a color difference has been reduced by, without changing the number of black dots which are high in density and have a significant influence on frequencies, adjusting the numbers of cyan dots, magenta dots, and yellow dots which are low in density and have a small influence on frequencies. This reduces a difference between the surface roughness (granularity) of an image caused by a density difference between the gray dot 10614 of the standard size and the black dot 10615 of the standard size in the first area and the surface roughness (granularity) of an image caused by such a density difference in the second area, i.e., a frequency difference. Accordingly, gray colors of the first area and the second area become approximately the same color, and the degrees of granularity also become approximately the same, so that color unevenness can be prevented or reduced from becoming visible due to a color difference and a frequency difference.

As described above, in the first exemplary embodiment, with regard to colors in which a color difference in multi-order color greatly varies, a measurement image is recorded on a recording medium and table parameters are obtained based on a result of measurement using the recorded measurement image. This is because the color difference amount, which is a cause for color difference, depends on both a color which is recorded in each recording area and a recording characteristic for each ink color used for recording in a recording area, according to the principle of occurrence of a color difference. The recording area is an area obtained by dividing an area usable for recording on a recording medium into a plurality of parts in a nozzle arrangement direction. Here, the conceivable recording characteristic for each ink color can include, in addition to the amount of ink per ink drop (the discharge amount), elements which affect the shape and density of a dot formed on a recording medium and the color appearance of each ink in a dot formed by overlapping of dots, such as the discharging direction, the shape of a dot, the penetration rate of ink, and the type of a recording medium.

Furthermore, the color difference amount depends on a combination of recording characteristics of ink colors which are used for recording of a target color, and clearly does not depend on the recording characteristic of an ink color which is not used for recording. Thus, the types and numbers of associated ink colors differ for each pixel, and there can be a case where only one ink color is associated depending on pixels and the color difference amount is thus 0.

Furthermore, out of ink colors for use in a recording apparatus, with regard to a color which is able to be expressed by ink of a single color, since the density thereof is previously adjusted by HS processing, color shift (color difference) does not occur. Accordingly, with regard to such a color, a converting operation of the MCS processing unit 405 for reducing a difference in color tone is not required. Such a state is specifically described as follows with a case where the measurement color space and the ink color space have almost coincided with each other taken as an example.

Ina case where the measurement color space and the ink color space have almost coincided with each other, for example, with regard to a cyan color indicating (K=0, C=255, M=0, Y=0), since density adjustment has previously been performed by HS processing, the MCS processing unit 405 does not need to correct data for the cyan color. Therefore, it is desirable to set the equivalent correction value to $Y^{-1}[1]=Y^{-1}[2]=0=(0, 0, 0, 0)$. Moreover, with regard to a magenta color indicating (K=0, C=0, M=255, Y=0), similarly, since density adjustment has previously been performed by HS processing, the MCS processing unit 405 also does not need to correct data for the magenta color. Therefore, it is desirable to set the equivalent correction value to $Y^{-1}[1]=Y^{-1}[2]=0=(0, 0, 0, 0)$.

On the other hand, with regard to a blue color indicating (K=0, C=255, M=255, Y=0), as mentioned above with reference to FIGS. 3A to 3C, a color difference is highly likely to occur even if HS processing is performed. Therefore, in the example illustrated in FIG. 6B, the respective equivalent correction values are set as follows.

Equivalent correction value $Y^{-1}[1]=0=(0,0,0,0)$

Equivalent correction value $Y^{-1}[2]=H(Rt,Gt,Bt)-H(R2,G2,B2)$

Thus, since, even if C=255, a color difference occurs depending on a combination of other M value, Y value, and K value, the values appropriate as equivalent correction values differ. In other words, in the above-mentioned table generation, grid points having the above-mentioned appropriate equivalent correction values as grid point data are selected as grid points of a color in which the tendency of color shift greatly varies. The MCS processing unit 405 uses a three-dimensional lookup table obtained based on a result of measurement of a measurement image for a color of such appropriately selected grid points.

Furthermore, in step S510 for generating table parameters for the MCS processing unit 405, the following operation can be performed as another example.

First, the CPU 311 varies pieces of ink color data (K, C, M, Y) independently of each other, and records measurement images including a plurality of patches with the recording heads 101 to 104. At this time, when the CPU 311 performs recording with five gradation levels of 0, 64, 128, 192, and 255 for each ink color, $5^3=625$ patches in total are recorded. Then, the CPU 311 estimates a patch color (Rp, Gp, Bp) closest to a target color (Rt, Gt, Bt) corresponding to ink color data (Ki, Ci, Mi, Yi) based on patch color information obtained by measuring each patch. Next, the CPU 311 obtains ink color data (Kn, Cn, Mn, Yn) corresponding to the estimated patch color. Then, the CPU 311 can generate a correction table for converting ink color data (Ki, Ci, Mi, Yi) into ink color data (Kn, Cn, Mn, Yn). Actually, the CPU 311 is able to improve estimation accuracy by recording patches the number of which is larger than 625, i.e., recording patches at fine gradation levels, and is also able to improve estimation accuracy by using a known method such as interpolation computation.

Moreover, to correct a color difference amount which depends on discharge characteristics for respective ink colors, the MCS processing unit 405 needs to be able to switch correction data depending on each recording area. For example, the MCS processing unit 405 is able to address such a need by retaining three-dimensional lookup tables the number of which corresponds to the number of recording areas and switching the three-dimensional lookup tables depending on the recording areas.

Furthermore, for example, even in a multivalued recording apparatus capable of changing the sizes of dots, such as a four-valued recording apparatus which performs recording with dots of three levels, i.e., large, medium, and small dots, variation in discharge amount for each nozzle may occur. Even in this case, for a reason similar to the above-mentioned reason, even when conventional correction by head shading is performed, color unevenness may become visible. Accordingly, the first exemplary embodiment can be applied to not only a recording apparatus of the two-valued type, which indicates recording or non-recording, but also a multivalued recording apparatus of the three-or-more-valued type.

While, in the first exemplary embodiment, an example in which the correction amount for K is set to 0 by providing constraints to the conversion coefficients a1 to a12 has been described, the correction amount for K only needs to be sufficiently small and thus only needs to be substantially 0. For example, even a configuration in which a given minute value $\varepsilon$ is set as a threshold value and conversion coefficients are restricted to values less than or equal to the threshold value, such as a10≤$\varepsilon$, a11≤$\varepsilon$, and a12≤$\varepsilon$, is able to attain an advantageous effect of the first exemplary embodiment. Since the appropriate value for the threshold value $\varepsilon 0$ differs with the density of ink or the dot size, it is favorable that the above-mentioned granularity evaluation value is used as a method of determining the threshold value $\varepsilon$. In the experiment by the inventors, it was confirmed that, when the granularity evaluation value for each area was about 1.0 to 2.0, a difference in frequency became visible as color unevenness in a case there was a difference in granularity of one-tenth of the granularity evaluation value, i.e., about 0.1 to 0.2. Therefore, the value of 6 can be set by measuring a granularity (degree of granularity) relative to a combination of (K, C, M, Y) and selecting such a value of $\varepsilon$ as to cause a difference in degree of granularity to become less than or equal to 0.2. The degree of granularity used at this time is a root means square (RMS) degree of granularity or a degree of granularity calculated using a Wiener spectrum.

Furthermore, while, in the above-mentioned example, the correction amount for K is set to substantially 0 in all of the grid points of table parameters, it is not always necessary to set the correction amount for K to 0 in all of the grid points. For example, in an image low in lightness in which the amount of ink for K to be applied per unit area is large and color unevenness does not become visible even if there is a frequency difference, it is not necessary to take a frequency difference into consideration. With respect to image data indicating such a color, the equivalent correction value for K ink does not need to be set to 0.

The image in which it is better to set the equivalent correction value for K ink to substantially 0 is an image of a color high in lightness, in which a frequency difference caused by K ink is likely to become visible as color unevenness, i.e., an image low in optical density. In the first exemplary embodiment, image data for a color in which the equivalent correction value for K ink is to be set to substantially 0 is defined as follows. In a case where, with regard to the input ink color data (K, C, M, Y), the value of K is larger than 0, the values of at least two of C, M, and Y are larger than 0, and the value of K is smaller than the sum of the values larger than 0 of the at least two of C, M, and Y, the equivalent correction value for K ink is set to substantially 0. Furthermore, in a case where the value of K is smaller than ½ of the sum of values of (K, C, M, Y), the equivalent correction value for K ink can be set to substantially 0. At this time, it is premised that pieces of ink color data (K, C, M, Y) are normalized values (for example, each piece of ink color data is a value of 0 to 255).

Moreover, the configuration for reducing a difference in frequency between areas can include, in addition to the configuration of setting the correction amount for K ink to substantially 0 or less than or equal to the threshold value E, a configuration of defining the difference in frequency with equivalent correction values for respective types of ink. The equivalent correction value corresponds to a difference between an input value obtained before being subjected to conversion by MCS processing and an output value obtained after the input value being subjected to conversion by MCS processing. The difference in frequency can be defined with the absolute value of a difference between respective values obtained before and after conversion for each ink color. For example, such a configuration that the absolute value of a difference between respective values obtained before and after conversion for K ink becomes smaller than the absolute value of a difference between respective values obtained before and after conversion for the other ink colors can be employed. Additionally, employing a configuration in which conversion is performed in such a manner that the absolute value of a difference between respective values obtained before and after conversion for K ink becomes smaller than the absolute value of a difference between respective values obtained before and after conversion for all of the other ink colors enables more increasing the advantageous effect of reducing a difference in frequency.

Moreover, the first exemplary embodiment can be applied to a case where, even if there is a large difference in the amount of K ink, solutions in which a color difference and a frequency difference are sufficiently small exist. In that case, a lookup table storing frequencies (degrees of granularity) associated with combinations of (K, C, M, Y) can be retained in a recording apparatus, frequencies for respective combinations of types of ink can be calculated, and a combination which causes a frequency difference between areas to become smaller can be selected. In generating such a lookup table, for example, pieces of ink color data (K, C, M, Y) are caused to change independently of each other and light measurement images including a plurality of patches are recorded with the recording heads 101 to 104 illustrated in FIG. 1. At this time, when recording is performed with five gradation levels of 0, 64, 128, 192, and 255 for each ink color, $5^3$=625 patches in total are recorded. Then, a table in which frequencies (degrees of granularity) and pieces of ink color data (Ki, Ci, Mi, Yi) are associated with each other can be generated.

FIG. 11 is a flowchart illustrating processing for generating a three-dimensional lookup table using the above-mentioned frequency lookup table. First, in step S1101, the CPU 311 acquires candidates for (K, C, M, Y) values which become a target color A=(Rt, Gt, Bt). At this time, by referring to a result of measurement performed in step S503, the CPU 311 is able to acquire a correspondence relationship between (K, C, M, Y) values and (R, G, B) values for respective areas. In the first exemplary embodiment, the CPU 311 acquires, as candidates, ink color data (Ki', Ci', Mi', Yi') in which a color difference between the (R, G, B) values and the target color A=(Rt, Gt, Bt) is smaller than a predetermined threshold value c.

In the first exemplary embodiment, a color difference is defined by the Euclidean distance in an 8-bit RGB space, and the threshold value $\varepsilon$ is set equal to 3. The method of acquiring candidates is not limited to the above-mentioned method, but can include, for example, a method of acquiring a predetermined number of candidates in ascending order of color difference.

Next, in step S102, the CPU 311 calculates frequency change amounts Δf of respective candidates. Specifically, first, the CPU 311 acquires, as a reference frequency, a frequency of ink color data (Ki, Ci, Mi, Yi) from a frequency lookup table. Similarly, the CPU 311 also acquires a frequency with respect to each of a plurality of candidates (Ki', Ci', Mi', Yi'). The CPU 311 calculates a frequency change amount Δf, which is a difference between these frequencies and the reference frequency, for each candidate.

Next, in step S1103, the CPU 311 selects a candidate for (K, C, M, Y) values the frequency change amount Δf of which is the smallest. Then, the CPU 311 stores a difference between the selected candidate (Ki', Ci', Mi', Yi') and the ink color data (Ki, Ci, Mi, Yi) in a three-dimensional lookup table.

Furthermore, a configuration of not using a lookup table but predicting a frequency for each combination of types of ink by a known simplified simulation can also be employed.

In the above-described first exemplary embodiment, an example in which the discharge amount of the nozzle group 10321 of the recording head 103 for magenta ink is larger than the standard discharge amount is used for description. In a second exemplary embodiment, an example in which the discharge amount of the nozzle group 10121 of the recording head 101 for black ink is larger than the standard discharge amount is used for description. Furthermore, portions which are in common with those in the above-described first exemplary embodiment are omitted from description or simplified for description.

Figure 12A:
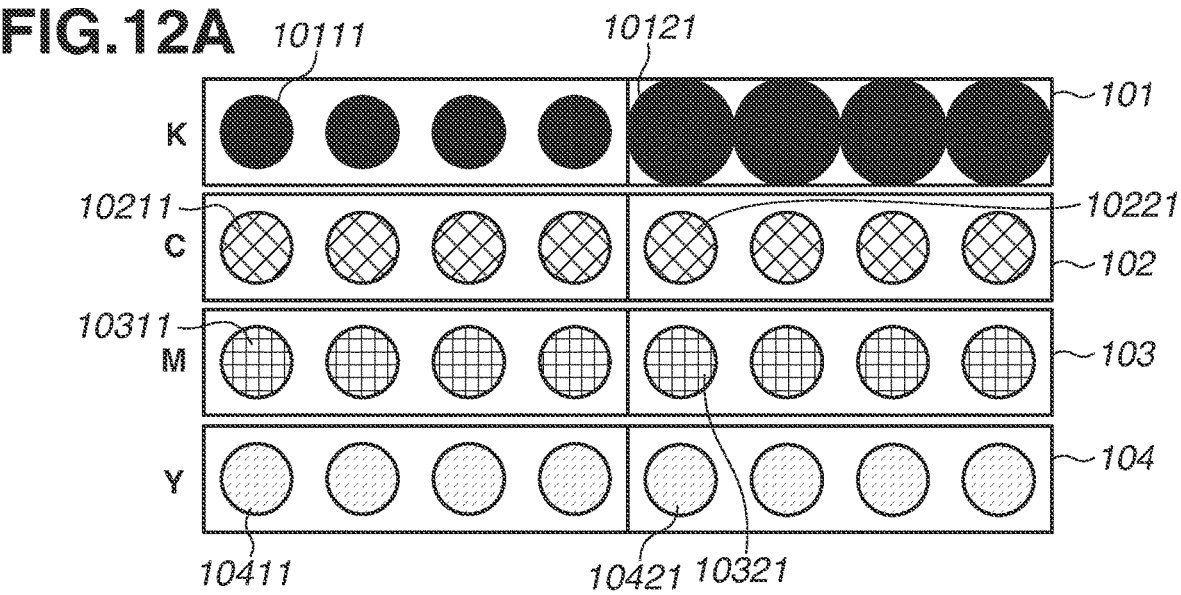
FIGS. 12A, 12B, and 12C are diagrams used to explain discharge characteristics of recording heads in a second exemplary embodiment of the disclosure.
Figure 12B:
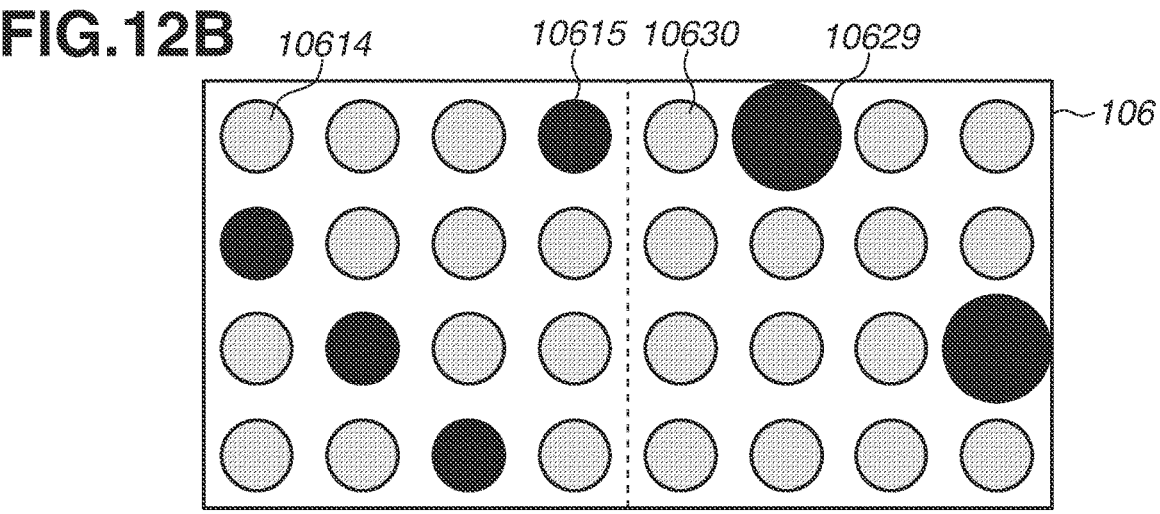
Figure 12C:
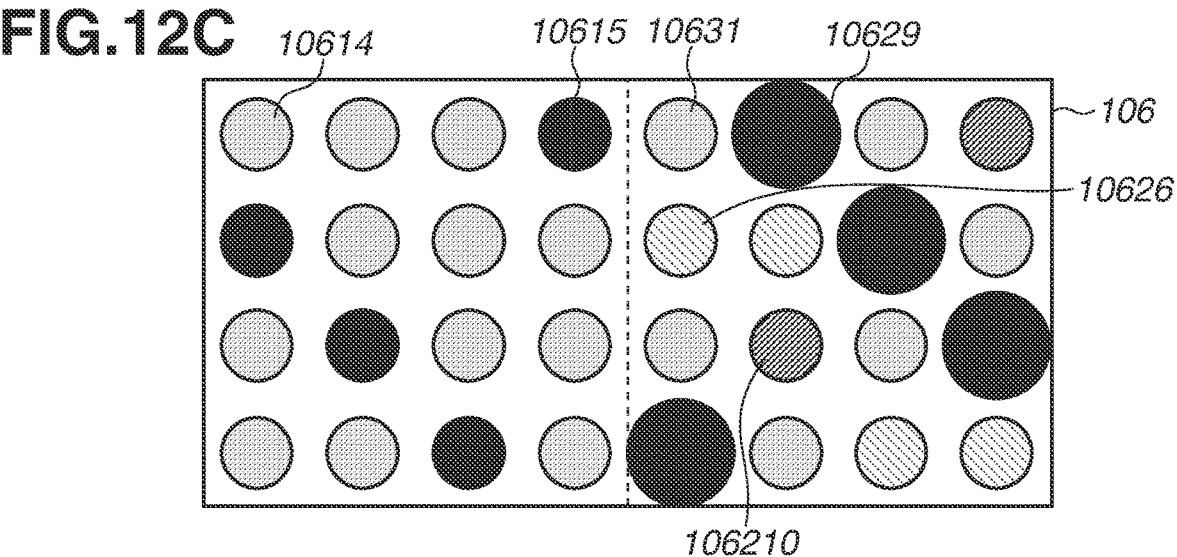

FIGS. 12A, 12B, and 12C are diagrams used to explain the discharge amounts of recording heads and the states of dots on a recording medium in the second exemplary embodiment. FIG. 12A illustrates nozzles of the recording heads 101 to 104, which discharge black ink, cyan ink, magenta ink, and yellow ink, respectively. Here, in the recording head 101 for black ink, out of eight nozzles illustrated in FIG. 12A, the discharge amount of a nozzle group including four nozzles 10121 on the right-hand side in FIG. 12A is an amount larger than the standard discharge amount. The discharge amount of each of the other nozzle groups is the standard discharge amount.

FIG. 12B illustrates a gray image recorded on the recording medium 106 based on image data subjected to HS processing in the case of recording an image with recording heads having such discharge characteristics. Here, image data for gray obtained before being subjected to HS processing is assumed to be (K, C, M, Y)=(64, 192, 192, 192).

In the first area on the left-hand side in FIG. 12B, gray dots 10614 of the standard size, each of which is formed by cyan ink, magenta ink, and yellow ink overlapping with each other, and black dots 10615 of the standard size, which is formed by black ink, are recorded. On the other hand, in the second area on the right-hand side in FIG. 12B, the number of black dots is changed to about ½ (from four dots to two dots) by HS processing. Then, black dots 10629, each of which is larger in size than the standard dot, and gray dots 10630 of the standard size, each of which is formed by cyan ink, magenta ink, and yellow ink overlapping with each other, are recorded.

Since, as with the example illustrated in FIG. 8B in the first exemplary embodiment, even in the example illustrated in FIG. 12B, the frequency in the first area and the frequency in the second area differ, the MCS processing unit 405 corrects image data in such a way as to reduce such a frequency difference. In the example in the second exemplary embodiment, even if the correction amount for black in the equivalent correction value $Y^{-1}[X]$ is set to 0, it is impossible to reduce a difference in frequency. The reason for this is that, if an HS processing unit following the MCS processing unit 405 corrects values corresponding to black ink and, the number of dots may be changed. Therefore, in the second exemplary embodiment, the HS processing unit 406 performs HS processing with respect to C ink, M ink, and Y ink, and does not perform HS processing with respect to K ink. Thus, the same value as the value of the color signal input to the HS processing unit 406 is output therefrom.

FIG. 12C is a diagram illustrating a result obtained in a case where MCS processing and HS processing in the second exemplary embodiment have been performed. In the second area on the right-hand side, black dots 10629, each of which is larger than the standard size, are formed. The number of black dots 10629 is the same as the number of black dots 10615 of the first area on the left-hand side. Moreover, in the second area on the right-hand side, green dots 10626, each of which is formed by a cyan dot and a yellow dot of the standard size being superposed on each other, blue dots 10631, each of which is formed by a cyan dot and a magenta dot of the standard size being superposed on each other, and reds dots 106210, each of which is formed by a magenta dot and a yellow dot of the standard size being superposed on each other, exist. This is because a color difference is reduced by adjusting the numbers of cyan dots, magenta dots, and yellow dots without changing the number of black dots. As a result, even in a case where it is necessary to correct discharge characteristics of nozzles which discharge black ink, which is likely to affect a frequency in an image, it is possible to prevent or reduce the occurrence of a difference in frequency by MCS processing while reducing a difference in color tone between areas by MCS processing.

Figure 4B:
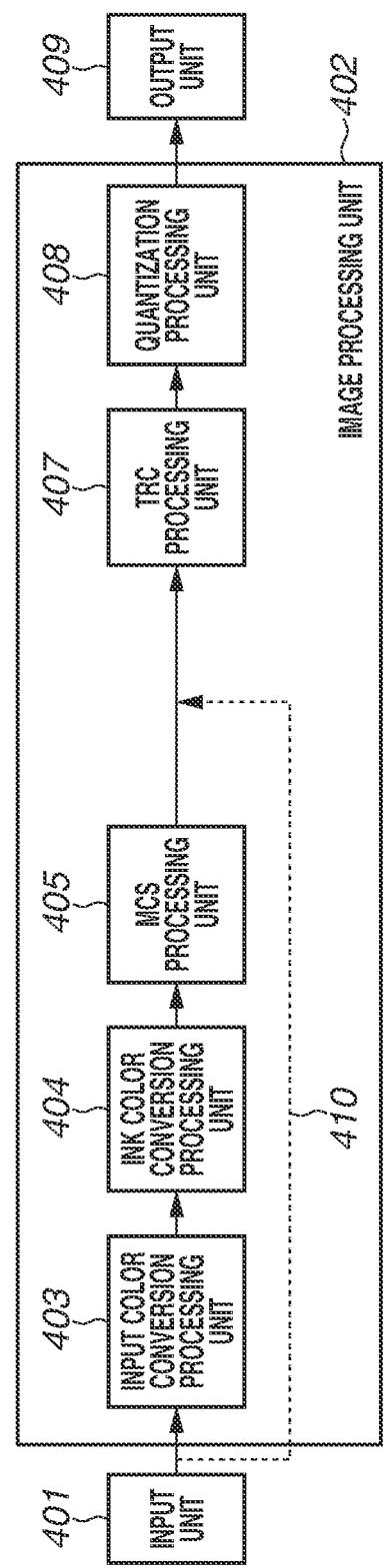

FIG. 4B is a block diagram illustrating a modification example of the configuration of an image processing unit in a recording apparatus. As illustrated in FIG. 4B, the respective units indicated by reference characters 401, 403 to 405, and 407 to 409 are the same as those indicated by the respective same reference characters in FIG. 4A, and, therefore, the description thereof is not repeated. In the present modification example, generation of table parameters for the MCS processing unit 405 and processing performed by the MCS processing unit 405 are the same as those illustrated in FIGS. 5A and 5B in the first exemplary embodiment, and a difference from the configuration illustrated in FIG. 4A is that HS processing by the HS processing unit 406 is not performed.

While, in the above-described second exemplary embodiment, a configuration in which HS processing is not performed with respect to black ink is employed, in the present modification example, HS correction is performed with respect to none of the types of ink. Then, with regard to MCS processing by the MCS processing unit 405, as with the first exemplary embodiment and the second exemplary embodiment, correction is not performed with respect to black ink. Not performing HS processing provides advantageous effects such as an improvement in processing speed, a decrease in memory capacity for tables for HS processing, and the omission of processes for recording and measurement of test patterns and correction parameter generation processing in HS processing. On the other hand, since a difference in discharge characteristics of black ink is not corrected in HS processing and image data corresponding to black ink is also not corrected in MCS processing, a color difference may not be completely corrected even by performing MCS processing. For example, in a dark portion of an image for which a large amount of black ink is used, even if the amounts of application of cyan ink, magenta ink, and yellow ink are increased while the amount of application of black ink remains unchanged, a desired density may not be able to be obtained. In that case, a reduction in color difference can be attained by selecting a combination of types of ink which causes the change amount of the amount of application of black ink in MCS processing to become minimum, by a method such as that of adjusting the above-mentioned threshold value ε.

Furthermore, respective processing contents in the above-described exemplary embodiments are merely examples, and any configuration can be employed as long as it is a configuration capable of attaining a reduction in color difference and frequency difference, which is advantageous effects of the disclosure. For example, an increase in processing speed can be attained by combining at least two contiguous processing operations, out of processing operations illustrated in FIG. 4A, into one processing operation. FIG. 4C illustrates an example of that combination, in which processing operations performed by an input color conversion processing unit and an MCS processing unit are configured as an integrated processing unit 411.

Moreover, the above-described exemplary embodiments are not limited to a configuration in which recording is performed with use of inks of four colors, K, C, M, and Y, and, for example, low-density ink, such as light cyan ink, light magenta ink, or gray, or special color ink, such as red ink, green ink, blue ink, orange ink, or violet ink, can also be used. FIG. 4D illustrates an example of that configuration, in which the image processing unit 402 includes a light and dense separation processing unit 412 following the MCS processing unit 405, and, with respect to data for K, C, M, and Y, using a known method, the light and dense separation processing unit 412 converts data corresponding to cyan ink into data corresponding to a combination of cyan ink and light cyan ink and converts data corresponding to magenta ink into data corresponding to a combination of magenta ink and light magenta ink.

Moreover, while, in processing of generation of table parameters for the MCS processing unit 405 illustrated in FIG. 5A, a method of first measuring a color difference amount and then calculating a correction value is used, another method can also be used. Moreover, setting a target color A in reducing a color difference is not always necessary. For example, a color difference in each area can be acquired and, then, a correction value for each area can be set based on the acquired color difference.

Moreover, while an area corresponding to a nozzle group including four contiguous nozzles is set as one unit area, the above-described exemplary embodiments are not limited to this, and a more number of nozzles can be set as one nozzle group. Moreover, one nozzle can be set as one unit. Moreover, the number of nozzles of a nozzle group corresponding to each area does not necessarily need to be the same, and can be set as appropriate according to characteristics of a recording apparatus. In a plurality of nozzle arrays which discharges a plurality of types of ink, a conversion table only needs to be associated with each set of nozzle groups used to perform recording in the same area on a recording medium.

Moreover, in the above-described exemplary embodiments, an example in which, when MCS processing is performed, correction to data for black ink is not performed or the correction amount therefor is made minute and, mainly, data for cyan ink, magenta ink, and yellow ink is corrected has been described. A configuration in which five or more color inks are provided is not limited to this example, and, to reproduce a desired color hue, adjustment only needs to be performed with use of at least three color inks. The color inks to be used for adjustment are not limited to cyan ink, magenta ink, and yellow ink, but can be a combination of light cyan ink, light magenta ink, and yellow ink or a combination of orange ink, green ink, and violet ink. If these examples are generalized, the color inks to be used for adjustment only need to have colors configuring a triangle including achromatic colors on a color space.

Moreover, the ink color to which correction is not performed or the correction amount of which is made minute is not limited to black. Processing for correcting none of the colors other than the above-mentioned three colors used for correction can be employed or processing for correcting none of only some colors can be employed. However, to prevent or reduce a difference in frequency, it is desirable to restrict the correction amount for ink which is high in optical density and is likely to become visible to a small amount.

Moreover, the above-described exemplary embodiments can be implemented by performing the following processing. The processing includes supplying software (program) for implementing the above-described functions to a system or apparatus via a network or various storage media and causing a computer (or, for example, a CPU or a micro processing unit (MPU)) of the system or apparatus to read and execute the program. The program is read by the computer to cause the computer to function as the above-described image processing apparatus.

Moreover, the above-described exemplary embodiments have been described with reference to an example in which MCS processing is performed on data converted into K, C, M, and Y by ink color conversion processing with respect to image data input in the RGB format, which is color signals of three primary colors. However, a configuration in which the above-mentioned image data for K, C, M, and Y is directly input to a recording apparatus can be employed. In that case, in the image processing unit 402, processing operations by the input color conversion processing unit 403 and the ink color conversion processing unit 404 become unnecessary.

According to aspects of the present disclosure, in the case of recording an image with use of a plurality of types of ink, a color difference and a frequency difference in a multi-order color image which occur due to variation in discharge characteristic between nozzles can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-158451 filed Aug. 30, 2019, which is hereby incorporated by reference herein in its entirety.

What is claimed is:

1. An image printing apparatus comprising:
a printing unit configured to print an image with a plurality of chromatic inks and an achromatic ink,
wherein the printing unit includes a first nozzle array including a plurality of nozzles for discharging first chromatic ink arranged in a predetermined direction, a second nozzle array including a plurality of nozzles for discharging second chromatic ink arranged in the predetermined direction, a third nozzle array including a plurality of nozzles for discharging third chromatic ink arranged in the predetermined direction, and a fourth nozzle array including a plurality of nozzles for discharging achromatic ink arranged in the predetermined direction,
wherein the printing unit prints an image in a first area on a printing medium with use of a first nozzle group in the first nozzle array, a second nozzle group in the second nozzle array, a third nozzle group in the third nozzle array, and a fourth nozzle group in the fourth nozzle array, and
wherein the printing unit prints an image in a second area different in position in the predetermined direction from the first area on the printing medium with use of a fifth nozzle group in the first nozzle array, the fifth nozzle group not including nozzles included in the first nozzle group, a sixth nozzle group in the second nozzle array, the sixth nozzle group not including nozzles included in the second nozzle group, a seventh nozzle group in the third nozzle array, the seventh nozzle group not including nozzles included in the third nozzle group, and an eighth nozzle group in the fourth nozzle array, the eight nozzle group not including nozzles included in the fourth nozzle group;
a multi-color shading (MCS) processing unit configured to convert a first combination including a color signal corresponding to the first chromatic ink, a color signal corresponding to the second chromatic ink, a color signal corresponding to the third chromatic ink and a color signal corresponding to the achromatic ink, which are input to be printed in the first area, into a second combination including a color signal corresponding to the first chromatic ink, a color signal corresponding to the second chromatic ink, a color signal corresponding to the third chromatic ink, and a color signal corresponding to the achromatic ink, and
to convert a third combination including a color signal corresponding to the first chromatic ink, a color signal corresponding to the second chromatic ink, a color signal corresponding to the third chromatic ink and a color signal corresponding to the achromatic fourth ink, which are input to be printed in the second area, into a fourth combination including a color signal corresponding to the first chromatic ink, a color signal corresponding to the second chromatic ink, a color signal corresponding to the third chromatic ink, and a color signal corresponding to the achromatic ink; and
a controller configured
to control the printing unit,
to print an image to the first area based on the converted color signal corresponding to the first chromatic ink included in the second combination, the converted color signal corresponding to the second chromatic ink included in the second combination, the converted color signal corresponding to the third chromatic ink included in the second combination, and the converted color signal corresponding to the achromatic ink included in the second combination and
to print an image to the second area based on the converted color signal corresponding to the first chromatic ink included in the fourth combination, the converted color signal corresponding to the second chromatic ink included in the fourth combination, the converted color signal corresponding to the third chromatic ink included in the fourth combination and the converted color signal corresponding to the achromatic ink included in the fourth combination,
wherein, in a case where values of the color signals in the first combination equal the respective values of the color signals in the third combination, and
(1) the value of the color signal corresponding to the achromatic ink is larger than 0,
(2) at least two of the values of the color signals corresponding to the first, second and third chromatic inks are larger than 0, and
(3) the value of the color signal corresponding to the achromatic ink is smaller than a sum of the values of the color signals corresponding to the at least two of the first, second and third chromatic inks,
the conversion of the MCS processing unit is performed such that the value of the color signal corresponding to the achromatic ink in the second combination equals the value of the color signal corresponding to the achromatic ink in the first combination, and the value of the color signal corresponding to the achromatic ink in the fourth combination equals the value of the color signal corresponding to the achromatic ink in the third combination,
so that a difference between a color of the image printed in the first area and a color of the image printed in the second area is reduced and a difference between a frequency of the image printed in the first area and a frequency of the image printed in the second area is reduced.

2. The image printing apparatus according to claim 1,
wherein a first value is an absolute value of a difference between a value of the color signal corresponding to the first chromatic ink in the first combination and a value of the color signal corresponding to the first chromatic ink in the second combination after conversion, wherein a second value is an absolute value of a difference between a value of the color signal corresponding to the second chromatic ink in the first combination and a value of the color signal corresponding to the second chromatic ink in the second combination after correction, wherein a third value is an absolute value of a difference between a value of the color signal corresponding to the third chromatic ink in the first combination and a value of the color signal corresponding to the third chromatic ink in the second combination after conversion, wherein a fourth value is an absolute value of a difference between a value of the color signal corresponding to the achromatic ink in the first combination and a value of the color signal corresponding to the achromatic ink in the second combination after conversion, and wherein, the fourth value is smaller than a sum of the first value, the second value, and the third value.

3. The image printing apparatus according to claim 2, wherein, in a case where values of the color signals in the first combination equal respective values of the color signals in the third combination, the fourth value is smaller than the first value, the fourth value is smaller than the second value, and the fourth value is smaller than the third value.

4. The image printing apparatus according to claim 2, wherein the fourth value is less than or equal to a predetermined threshold value.

5. The image printing apparatus according to claim 2, wherein the fourth value is substantially 0.

6. The image printing apparatus according to claim 1, wherein a color saturation of a dot of the achromatic ink, which is formed on the printing medium, is higher than a color saturation of a dot of the first chromatic ink, which is printed on the printing medium, is higher than a dot of the second chromatic ink, which is printed on the printing medium, and is higher than a color saturation of a dot of the third chromatic ink.

7. The image printing apparatus according to claim 1, wherein lightness of the achromatic ink is lower than lightness of the first chromatic ink, is lower than lightness of the second chromatic ink, and is lower than lightness of the third chromatic ink.

8. The image printing apparatus according to claim 1, wherein the achromatic ink is black ink.

9. The image printing apparatus according to claim 1, wherein each of the first chromatic ink, the second chromatic ink, and the third chromatic ink is any one of cyan ink, magenta ink, and yellow ink.

10. The image printing apparatus according to claim 1, wherein, in a case where values of the color signals in the first combination equal the respective values of the color signals in the third combination, the conversion of the MCS processing unit is performed such that a difference between a frequency of the image printed in the first area and a frequency of the image printed in the second area is a difference between a root means square (RMS) degree of granularity of the image printed in the first area and an RMS degree of granularity of the image printed in the second area, or a difference between a degree of granularity of the image printed in the first area and a degree of granularity of the image printed in the second area calculated using a Wiener spectrum.

11. The image printing apparatus according to claim 1, further comprising a Head-Shading (HS) processing unit configured to convert a color signal corresponding to the first chromatic ink to be printed in the first area converted by the conversion unit and a color signal corresponding to the first chromatic ink to be printed in the second area converted by the conversion unit in such a way as to reduce a difference between a density of an image which is printed in the first area by the first chromatic ink being discharged with use of only the first nozzle group in a case where a first color signal corresponding to the first chromatic ink is input and a density of an image which is printed in the second area by the first chromatic ink being discharged with use of only the fifth nozzle group in a case where the first color signal corresponding to the first chromatic ink is input, to convert a color signal corresponding to the second chromatic ink to be printed in the first area converted by the conversion unit and a color signal corresponding to the second chromatic ink to be printed in the second area converted by the conversion unit in such a way as to reduce a difference between a density of an image which is printed in the first area by the second chromatic ink being discharged with use of only the second nozzle group in a case where a second color signal corresponding to the second chromatic ink is input and a density of an image which is printed in the second area by the second chromatic ink being discharged with use of only the sixth nozzle group in a case where the second color signal corresponding to the second chromatic ink is input, to convert a color signal corresponding to the third chromatic ink to be printed in the first area converted by the conversion unit and a color signal corresponding to the third chromatic ink to be printed in the second area converted by the conversion unit in such a way as to reduce a difference between a density of an image which is printed in the first area by the third chromatic ink being discharged with use of only the third nozzle group in a case where a third color signal corresponding to the third chromatic ink is input and a density of an image which is printed in the second area by the third chromatic ink being discharged with use of only the seventh nozzle group in a case where the third color signal corresponding to the third chromatic ink is input, and to convert a color signal corresponding to the achromatic ink to be printed in the first area converted by the conversion unit and a color signal corresponding to the achromatic ink to be printed in the second area converted by the conversion unit in such a way as to reduce a difference between a density of an image which is printed in the first area by the achromatic ink being discharged with use of only the fourth nozzle group in a case where a fourth color signal corresponding to the achromatic ink is input and a density of an image which is printed in the second area by the achromatic ink being discharged with use of only the eighth nozzle group in a case where the fourth color signal corresponding to the achromatic ink is input.

12. The image printing apparatus according to claim 11, wherein, upon receiving input of the fourth color signal corresponding to the achromatic ink, the HS processing unit outputs a value equal to that of the fourth color signal as a converted value.

13. The image printing apparatus according to claim 11, wherein the MCS processing unit converts a combination of an input plurality of color signals using parameters generated based on a test pattern printed based on the color signals converted by the HS processing unit.

14. The image printing apparatus according to claim 1, wherein each of the first nozzle group, the second nozzle group, the third nozzle group, the fourth nozzle group, the fifth nozzle group, the sixth nozzle group, the seventh nozzle group and the eighth nozzle group includes one nozzle or two or more nozzles contiguous in the predetermined direction.

15. An image printing method for a printing apparatus with a printing unit configured to print an image with a plurality of chromatic inks and an achromatic ink, wherein the printing apparatus includes a first nozzle array including a plurality of nozzles for discharging first chromatic ink arranged in a predetermined direction, a second nozzle array including a plurality of nozzles for discharging second chromatic ink arranged in the predetermined direction, a third nozzle array including a plurality of nozzles for discharging third chromatic ink arranged in the predetermined direction, and a fourth nozzle array including a plurality of nozzles for discharging achromatic ink arranged in the predetermined direction, prints an image in a first area on a printing medium with use of a first nozzle group including at least one nozzle in the first nozzle array, a second nozzle group including at least one nozzle in the second nozzle array, a third nozzle group including at least one nozzle in the third nozzle array, and a fourth nozzle group including at least one nozzle in the fourth nozzle array, and prints an image in a second area different in position in the predetermined direction from the first area on the printing medium with use of a fifth nozzle group in the first nozzle array, the fifth nozzle group not including nozzles included in the first nozzle group, a sixth nozzle group in the second nozzle array, the sixth nozzle group not including nozzles included in the second nozzle group, a seventh nozzle group in the third nozzle array, the seventh nozzle group not including nozzles included in the third nozzle group, and an eighth nozzle group in the fourth nozzle array, the eighth nozzle group not including nozzles included in the fourth nozzle group, the image printing method comprising:

converting a first combination including a color signal corresponding to the first chromatic ink, a color signal corresponding to the second chromatic ink, a color signal corresponding to the third chromatic ink and a color signal corresponding to the achromatic ink, which are input to be printed in the first area, into a second combination including a color signal corresponding to the first chromatic ink, a color signal corresponding to the second chromatic ink, a color signal corresponding to the third chromatic ink, and a color signal corresponding to the achromatic ink, and converting a third combination including a color signal corresponding to the first chromatic ink, a color signal corresponding to the second chromatic ink, a color signal corresponding to the third chromatic ink, and a color signal corresponding to the achromatic ink, which are input to be printed in the second area, into a fourth combination including a color signal corresponding to the first chromatic ink, a color signal corresponding to the second chromatic ink, a color signal corresponding to the third chromatic ink, and a color signal corresponding to the achromatic ink, printing an image to the first area based on the converted color signal corresponding to the first chromatic ink included in the second combination, the converted color signal corresponding to the second chromatic ink included in the second combination, the converted color signal corresponding to the third chromatic ink included in the second combination and the converted color signal corresponding to the achromatic ink included in the second combination, and printing an image to the second area based on the converted color signal corresponding to the first chromatic ink included in the fourth combination, the converted color signal corresponding to the second chromatic ink included in the fourth combination, the converted color signal corresponding to the third chromatic ink included in the fourth combination and the converted color signal corresponding to the achromatic ink included in the fourth combination, wherein, in a case where values of the color signals in the first combination equal the respective values of the color signals in the third combination, and (1) the value of the color signal corresponding to the achromatic ink is larger than 0, (2) at least two of the values of the color signals corresponding to the first, second and third chromatic inks are larger than 0, and (3) the value of the color signal corresponding to the achromatic ink is smaller than a sum of the values of the color signals corresponding to the at least two of the first, second and third chromatic inks, the converting is performed such that the value of the color signal corresponding to the achromatic ink in the second combination equals the value of the color signal corresponding to the achromatic ink in the first combination, and the value of the color signal corresponding to the achromatic ink in the fourth combination equals the value of the color signal corresponding to the achromatic ink in the third combination, so that a difference between a color of the image printed in the first area and a color of the image printed in the second area is reduced and a difference between a frequency of the image printed in the first area and a frequency of the image printed in the second area is reduced.

16. A non-transitory computer-readable storage medium storing computer-executable instructions that, when executed by a computer, cause the computer to perform an image printing method for a printing apparatus with a printing unit configured to print an image with a plurality of chromatic inks and an achromatic ink, wherein the printing apparatus includes a first nozzle array including a plurality of nozzles for discharging first chromatic ink arranged in a predetermined direction, a second nozzle array including a plurality of nozzles for discharging second chromatic ink arranged in the predetermined direction, a third nozzle array including a plurality of nozzles for discharging third chromatic ink arranged in the predetermined direction, and a fourth nozzle array including a plurality of nozzles for discharging achromatic ink arranged in the predetermined direction, prints an image in a first area on a printing medium with use of a first nozzle group including at least one nozzle in the first nozzle array, a second nozzle group including at least one nozzle in the second nozzle array, a third nozzle group including at least one nozzle in the third nozzle array, and a fourth nozzle group including at least one nozzle in the fourth nozzle array, and prints an image in a second area different in position in the predetermined direction from the first area on the printing medium with use of a fifth nozzle group in the first nozzle array, the fifth nozzle group not including nozzles included in the first nozzle group, a sixth nozzle group in the second nozzle array, the sixth nozzle group not including nozzles included in the second nozzle group, a seventh nozzle group in the third nozzle array, the seventh nozzle group not including nozzles included in the third nozzle group, and an eighth nozzle group in the fourth nozzle array, the eighth nozzle group not including nozzles included in the fourth nozzle group, the image printing method comprising:

converting a first combination including a color signal corresponding to the first chromatic ink, a color signal corresponding to the second chromatic ink, a color signal corresponding to the third chromatic ink and a color signal corresponding to the achromatic ink, which are input to be printed in the first area, into a second combination including a color signal corresponding to the first chromatic ink, a color signal corresponding to the second chromatic ink, a color signal corresponding to the third chromatic ink, and a color signal corresponding to the achromatic ink, and converting a third combination including a color signal corresponding to the first chromatic ink, a color signal corresponding to the second chromatic ink, a color signal corresponding to the third chromatic ink, and a color signal corresponding to the achromatic ink, which are input to be printed in the second area, into a fourth combination including a color signal corresponding to the first chromatic ink, a color signal corresponding to the second chromatic ink, a color signal corresponding to the third chromatic ink, and a color signal corresponding to the achromatic ink, printing an image to the first area based on the converted color signal corresponding to the first chromatic ink included in the second combination, the converted color signal corresponding to the second chromatic ink included in the second combination, the converted color signal corresponding to the third chromatic ink included in the second combination and the converted color signal corresponding to the achromatic ink included in the second combination, and printing an image to the second area based on the converted color signal corresponding to the first chromatic ink included in the fourth combination, the converted color signal corresponding to the second chromatic ink included in the fourth combination, the converted color signal corresponding to the third chromatic ink included in the fourth combination and the converted color signal corresponding to the achromatic ink included in the fourth combination, wherein, in a case where values of the color signals in the first combination equal the respective values of the color signals in the third combination, and (1) the value of the color signal corresponding to the achromatic ink is larger than 0, (2) at least two of the values of the color signals corresponding to the first, second and third chromatic inks are larger than 0, and (3) the value of the color signal corresponding to the achromatic ink is smaller than a sum of the values of the color signals corresponding to the at least two of the first, second and third chromatic inks, the converting is performed such that the value of the color signal corresponding to the achromatic ink in the second combination equals the value of the color signal corresponding to the achromatic ink in the first combination, and the value of the color signal corresponding to the achromatic ink in the fourth combination equals the value of the color signal corresponding to the achromatic ink in the third combination, so that a difference between a color of the image printed in the first area and a color of the image printed in the second area is reduced and a difference between a frequency of the image printed in the first area and a frequency of the image printed in the second area is reduced.

17. A system comprising;

an image printing apparatus, and a printing unit configured to print an image with a plurality of chromatic inks and an achromatic ink, wherein the printing unit includes a first nozzle array including a plurality of nozzles for discharging first chromatic ink arranged in a predetermined direction, a second nozzle array including a plurality of nozzles for discharging second chromatic ink arranged in the predetermined direction, a third nozzle array including a plurality of nozzles for discharging third chromatic ink arranged in the predetermined direction, and a fourth nozzle array including a plurality of nozzles for discharging achromatic ink arranged in the predetermined direction, wherein the printing unit prints an image in a first area on a printing medium with use of a first nozzle group in the first nozzle array, a second nozzle group in the second nozzle array, a third nozzle group in the third nozzle array, and a fourth nozzle group in the fourth nozzle array, and wherein the printing unit prints an image in a second area different in position in the predetermined direction from the first area on the printing medium with use of a fifth nozzle group in the first nozzle array, the fifth nozzle group not including nozzles included in the first nozzle group, a sixth nozzle group in the second nozzle array, the sixth nozzle group not including nozzles included in the second nozzle group, a seventh nozzle group in the third nozzle array, the seventh nozzle group not including nozzles included in the third nozzle group, and an eighth nozzle group in the fourth nozzle array, the eight nozzle group not including nozzles included in the fourth nozzle group;

a multi-color shading (MCS) processing unit configured to convert a first combination including a color signal corresponding to the first chromatic ink, a color signal corresponding to the second chromatic ink, a color signal corresponding to the third chromatic ink and a color signal corresponding to the achromatic ink, which are input to be printed in the first area, into a second combination including a color signal corresponding to the first chromatic ink, a color signal corresponding to the second chromatic ink, a color signal corresponding to the third chromatic ink, and a color signal corresponding to the achromatic ink, and to convert a third combination including a color signal corresponding to the first chromatic ink, a color signal corresponding to the second chromatic ink, a color signal corresponding to the third chromatic ink and a color signal corresponding to the achromatic ink, which are input to be printed in the second area, into a fourth combination including a color signal corresponding to the first chromatic ink, a color signal corresponding to the second chromatic ink, a color signal corresponding to the third chromatic ink, and a color signal corresponding to the achromatic ink; and a controller configured to control the printing unit, to print an image to the first area based the converted color signal corresponding to the first chromatic ink included in the second combination, the converted color signal corresponding to the second chromatic ink included in the second combination, the converted color signal corresponding to the third chromatic ink included in the second combination, and the converted color signal corresponding to the achromatic ink included in the second combination and to print an image to the second area based on the converted color signal corresponding to the first chromatic ink included in the fourth combination, the converted color signal corresponding to the second chromatic ink included in the fourth combination, the converted color signal corresponding to the third chromatic ink included in the fourth combination and the converted color signal corresponding to the achromatic ink included in the fourth combination, wherein, in a case where values of the color signals in the first combination equal the respective values of the color signals in the third combination, and (1) the value of the color signal corresponding to the achromatic ink is larger than 0, (2) at least two of the values of the color signals corresponding to the first, second and third chromatic inks are larger than 0, and (3) the value of the color signal corresponding to the achromatic ink is smaller than a sum of the values of the color signals corresponding to the at least two of the first, second and third chromatic inks, the conversion of the MCS processing unit is performed such that the value of the color signal corresponding to the achromatic ink in the second combination equals the value of the color signal corresponding to the achromatic ink in the first combination, and the value of the color signal corresponding to the achromatic ink in the fourth combination equals the value of the color signal corresponding to the achromatic ink in the third combination, so that a difference between a color of the image printed in the first area and a color of the image printed in the second area is reduced and a difference between a frequency of the image printed in the first area and a frequency of the image printed in the second area is reduced.

18. An image processing apparatus for a printing apparatus, wherein the printing apparatus includes a plurality of nozzle arrays including a plurality of nozzles arranged in a predetermined direction, each array corresponding to an ink of a plurality of inks, and prints an image on a recording medium by discharging the plurality of inks from the plurality of nozzles included in the corresponding nozzle array according to a combination of output color signals determined by the image processing apparatus, the image processing apparatus comprising:

a processor; and a memory coupled to the processor storing instructions that, when executed by the processor, cause the processor to convert input color signals, for printing a first image in a first area of the recording material, into output color signals, for controlling a discharge of ink from the respective nozzles corresponding to the first area, convert input color signals, for printing a second image in a second area of the recording material, into output color signals, for controlling a discharge of ink from the respective nozzles corresponding to the second area, correct, using Multi-Color Shading (MCS) processing and Head-Shading (HS) processing, the output color signals for predetermined variations in the discharge of the nozzles used in the printing of the first image and the second image, and in a case of one ink of the plurality of inks being an achromatic ink, constrain the correction by the MCS processing of the output color signals for the one ink.

* * * * *